(12) United States Patent
Mushtaq et al.

(10) Patent No.: US 10,200,384 B1
(45) Date of Patent: *Feb. 5, 2019

(54) DISTRIBUTED SYSTEMS AND METHODS FOR AUTOMATICALLY DETECTING UNKNOWN BOTS AND BOTNETS

(71) Applicant: FireEye, Inc., Milpitas, CA (US)

(72) Inventors: Atif Mushtaq, Union City, CA (US); Todd Rosenberry, Mountain View, CA (US); Ashar Aziz, Fremont, CA (US); Ali Islam, Union City, CA (US)

(73) Assignee: FireEye, Inc., Milpitas, CA (US)

(*) Notice: Subject to any disclaimer, the term of this patent is extended or adjusted under 35 U.S.C. 154(b) by 71 days.

This patent is subject to a terminal disclaimer.

(21) Appl. No.: 15/250,770

(22) Filed: Aug. 29, 2016

Related U.S. Application Data

(63) Continuation of application No. 13/830,573, filed on Mar. 14, 2013, now Pat. No. 9,430,646.

(51) Int. Cl.
*G06F 11/00* (2006.01)
*G06F 21/56* (2013.01)
(Continued)

(52) U.S. Cl.
CPC ...... *H04L 63/1416* (2013.01); *H04L 63/1425* (2013.01); *H04L 63/1433* (2013.01); *H04L 67/02* (2013.01)

(58) Field of Classification Search
CPC ............. H04L 63/1416; H04L 63/1425; H04L 63/1433; H04L 67/02; G06F 21/56; G06F 21/564; G06F 21/565; G06F 21/566
(Continued)

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | | |
|---|---|---|---|
| GB | 2439806 A | 1/2008 | |
| GB | 2490431 A | 10/2012 | |

(Continued)

OTHER PUBLICATIONS

Leading Colleges Select FireEye to Stop Malware-Related Data Breaches, FireEye Inc., 2009.*

(Continued)

*Primary Examiner* — Shanto Abedin
(74) *Attorney, Agent, or Firm* — Rutan & Tucker, LLP

(57) ABSTRACT

A system and method for detecting malicious activity through one or more local analyzers and a central analyzer. The local analyzer captures packets that are part of communications over a network, generates a signature from information obtained from one or more of the captured packets, and determines whether the signature matches any signature of a first plurality of signatures stored in a first storage device that is accessible to the first local analyzer. The central analyzer remotely receives a portion of the information and the signature from the first local analyzer in response to the signature failing to match any of the signatures stored in the first storage device. The central analyzer determines whether the signature matches any global signature stored within a second storage device that is accessible to the central analyzer.

21 Claims, 9 Drawing Sheets

(51) Int. Cl.
*G06F 21/57* (2013.01)
*H04L 29/06* (2006.01)
*H04L 29/08* (2006.01)

(58) Field of Classification Search
USPC .......................................... 726/11–14, 22–25
See application file for complete search history.

(56) References Cited

U.S. PATENT DOCUMENTS

| | | |
|---|---|---|
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,516,488 B1 | 4/2009 | Kienzle et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 * | 9/2012 | Ranjan ............... H04L 61/1511 709/224 |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |

(56) References Cited

U.S. PATENT DOCUMENTS

| | | | |
|---|---|---|---|
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,499,357 B1* | 7/2013 | Juvekar | G06F 21/54 380/277 |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,388 B1 | 10/2013 | Wang et al. | |
| 8,555,391 B1 | 10/2013 | Demir et al. | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,379 B1* | 5/2014 | Stiansen | H04L 63/1491 726/22 |
| 8,726,392 B1 | 5/2014 | McCorkendale et al. | |
| 8,739,280 B2 | 5/2014 | Chess et al. | |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 | 9/2014 | Staniford et al. | |
| 8,881,234 B2 | 11/2014 | Narasimhan et al. | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,694 B2 | 8/2015 | Aziz et al. | |
| 9,118,715 B2 | 8/2015 | Staniford et al. | |
| 9,143,522 B2 | 9/2015 | Wang et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,282,109 B1 | 3/2016 | Aziz et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0095607 A1 | 7/2002 | Lin-Hendel | |
| 2002/0116627 A1 | 8/2002 | Tarbotton et al. | |
| 2002/0144156 A1 | 10/2002 | Copeland | |
| 2002/0162015 A1 | 10/2002 | Tang | |
| 2002/0166063 A1 | 11/2002 | Lachman et al. | |
| 2002/0169952 A1 | 11/2002 | DiSanto et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0101381 A1 | 5/2003 | Mateev et al. | |
| 2003/0115483 A1 | 6/2003 | Liang | |
| 2003/0188190 A1 | 10/2003 | Aaron et al. | |
| 2003/0191957 A1 | 10/2003 | Hypponen et al. | |
| 2003/0200460 A1 | 10/2003 | Morota et al. | |
| 2003/0212902 A1 | 11/2003 | van der Made | |
| 2003/0217283 A1 | 11/2003 | Hrastar et al. | |
| 2003/0229801 A1 | 12/2003 | Kouznetsov et al. | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0064737 A1 | 4/2004 | Milliken et al. | |
| 2004/0083408 A1 | 4/2004 | Spiegel et al. | |
| 2004/0088581 A1 | 5/2004 | Brawn et al. | |
| 2004/0093513 A1 | 5/2004 | Cantrell et al. | |
| 2004/0111531 A1 | 6/2004 | Staniford et al. | |
| 2004/0117478 A1 | 6/2004 | Triulzi et al. | |
| 2004/0117624 A1 | 6/2004 | Brandt et al. | |
| 2004/0128355 A1 | 7/2004 | Chao et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0250124 A1* | 12/2004 | Chesla | G06F 21/552 726/13 |
| 2004/0255161 A1 | 12/2004 | Cavanaugh | |
| 2004/0268147 A1 | 12/2004 | Wiederin et al. | |
| 2005/0005159 A1 | 1/2005 | Oliphant | |
| 2005/0021740 A1 | 1/2005 | Bar et al. | |
| 2005/0033960 A1 | 2/2005 | Vialen et al. | |
| 2005/0033989 A1 | 2/2005 | Poletto et al. | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0091652 A1 | 4/2005 | Ross et al. | |
| 2005/0108562 A1 | 5/2005 | Khazan et al. | |
| 2005/0114663 A1 | 5/2005 | Cornell et al. | |
| 2005/0125195 A1 | 6/2005 | Brendel | |
| 2005/0149726 A1 | 7/2005 | Joshi et al. | |
| 2005/0157662 A1 | 7/2005 | Bingham et al. | |
| 2005/0183143 A1 | 8/2005 | Anderholm et al. | |
| 2005/0201297 A1 | 9/2005 | Peikari | |
| 2005/0210533 A1 | 9/2005 | Copeland et al. | |
| 2005/0238005 A1 | 10/2005 | Chen et al. | |
| 2005/0240781 A1 | 10/2005 | Gassoway | |
| 2005/0262562 A1 | 11/2005 | Gassoway | |
| 2005/0265331 A1 | 12/2005 | Stolfo | |
| 2005/0283839 A1 | 12/2005 | Cowburn | |
| 2006/0010495 A1 | 1/2006 | Cohen et al. | |
| 2006/0015416 A1 | 1/2006 | Hoffman et al. | |
| 2006/0015715 A1 | 1/2006 | Anderson | |
| 2006/0015747 A1 | 1/2006 | Van de Ven | |
| 2006/0021029 A1 | 1/2006 | Brickell et al. | |

(56) References Cited

U.S. PATENT DOCUMENTS

| | | |
|---|---|---|
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0022454 A1 | 1/2007 | Yoon et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1* | 4/2007 | Bhikkaji ............... H04L 63/145 726/24 |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0084259 A1 | 4/2008 | Yoshida et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301444 A1* | 12/2008 | Kim ........................ H04L 63/08 713/169 |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0031358 A1* | 2/2010 | Elovici ................. H04L 41/147 726/24 |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |

(56) References Cited

U.S. PATENT DOCUMENTS

| | | |
|---|---|---|
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0320816 A1* | 12/2011 | Yao .................. G06F 21/316 726/24 |
| 2012/0023593 A1 | 1/2012 | Puder et al. |
| 2012/0054869 A1 | 3/2012 | Yen et al. |
| 2012/0066698 A1* | 3/2012 | Yanoo .................. G06F 11/28 719/330 |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0145066 A1 | 6/2012 | King |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1* | 3/2013 | McDougal ............ G06F 21/561 726/24 |
| 2013/0086684 A1 | 4/2013 | Mohler |
| 2013/0097699 A1* | 4/2013 | Balupari ............ G06F 21/552 726/22 |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0145471 A1* | 6/2013 | Richard ............... G06F 21/562 726/24 |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shifter et al. |
| 2013/0318073 A1 | 11/2013 | Shifter et al. |
| 2013/0325791 A1 | 12/2013 | Shifter et al. |
| 2013/0325792 A1 | 12/2013 | Shifter et al. |
| 2013/0325871 A1 | 12/2013 | Shifter et al. |
| 2013/0325872 A1 | 12/2013 | Shifter et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 02/23805 A2 | 3/2002 |
| WO | 02/006928 A2 | 8/2003 |
| WO | 200717636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Simon Heron, Technologies for Spam Detection, Network Security (Year: 2009).*

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

(56) References Cited

OTHER PUBLICATIONS

"When Virtual is Better Than Real", IEEEXplore Digital Library, available at, http://ieeexplore.ieee.org/xpl/articleDetails.isp?reload=true&arnumbe-r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
AltaVista Advanced Search Results. "attack vector identifier". Http://www.altavista.com/web/results?Itag=ody&pg=aq&aqmode=aqa=Event+Orch-estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch-esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., "Zlib compressed data format specification version 3.3" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc-&ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].
Marchette, David J., "Computer Intrusion Detection and Network Monitoring: A Statistical Viewpoint", ("Marchette"), (2001).
Margolis, P.E., "Random House Webster's 'Computer & Internet Dictionary 3rd Edition'", ISBN 0375703519, (Dec. 1998).
Moore, D., et al., "Internet Quarantine: Requirements for Containing Self-Propagating Code", INFOCOM, vol. 3, (Mar. 30-Apr. 3, 2003), pp. 1901-1910.

(56) References Cited

OTHER PUBLICATIONS

Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic etection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 13/830,573, filed Mar. 14, 2013 Final Office Action dated Jul. 15, 2015.
U.S. Appl. No. 13/830,573, filed Mar. 14, 2013 Non-Final Office Action dated Dec. 17, 2015.
U.S. Appl. No. 13/830,573, filed Mar. 14, 2013 Non-Final Office Action dated Dec. 31, 2014.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Wthyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

DISTRIBUTED SYSTEMS AND METHODS FOR AUTOMATICALLY DETECTING UNKNOWN BOTS AND BOTNETS

CROSS REFERENCE TO RELATED APPLICATIONS

This application is a continuation of U.S. patent application Ser. No. 13/830,573 filed Mar. 14, 2013, now U.S. Pat. No. 9,430,646 issued Aug. 30, 2016 and entitled "Distributed Systems And Methods For Automatically Detecting Unknown Bots And Botnets", the entire contents of which is incorporated herein by reference.

BACKGROUND

1. Field

The present invention relates generally to network security and more particularly to detecting malicious software operating in computers and other digital devices.

2. Discussion of Related Art

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to an HTTP standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs) that simulates or mimics a target operating environment. Such solutions monitor the behavior of content during execution to detect anomalies and other activity that may signal the presence of malware. One such system sold by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine using an instance of a browser to load the suspicious packets. The results of the analysis constitute monitored behaviors of the suspicious packets, which may indicate that the file should be declared malicious. The two-phase malware detection solution may detect numerous types of malware and, even malware missed by other commercially available approaches. Through its verification technique, the two-phase malware detection solution may also achieve a significant reduction of false positives relative to such other commercially available approaches. Otherwise, dealing with a large number of false positives in malware detection may needlessly slow or interfere with download of network content or receipt of email, for example. This two-phase approach has even proven successful against many types of polymorphic malware and other forms of advanced persistent threats.

In some instances, malware may take the form of a "bot," a contraction for software robot. Commonly, in this context, a bot is configured to control activities of a digital device (e.g., a computer) without authorization by the digital device's user. Bot-related activities include bot propagation to attack other computers on a network. Bots commonly propagate by scanning nodes (e.g., computers or other digital devices) available on a network to search for a vulnerable target. When a vulnerable computer is found, the bot may install a copy of itself, and then continue to seek other computers on a network to infect.

A bot may, without the knowledge or authority of the infected computer's user, establish a command and control (CnC) communication channel to send outbound communications to its master (e.g., a hacker or herder) or a designated surrogate and to receive instructions back. Often the CnC communications are sent over the Internet, and so comply with the Hypertext Transfer Protocol (HTTP) protocol. Bots may receive CnC communication from a centralized bot server or another infected computer (peer to peer). The outbound communications over the CnC channel are often referred to as "callbacks," and may signify that bots are installed and ready to act. Inbound CnC communications may contain instructions directing the bot to cause the infected computers (i.e., zombies) to participate in organized attacks against one or more computers on a network. For example, bot-infected computers may be directed to ping another computer on a network, such as a bank or government agency, in a denial-of-service attack, often referred to as a distributed denial-of-service attack (DDoS). In other examples, upon receiving instructions, a bot may (a) direct an infected computer to transmit spam across a network; (b) transmit information regarding or stored on the infected host computer; (c) act as a keylogger and record keystrokes on the infected host computer, or (d) search for personal information (such as email addresses contained in an email or a contacts file). This information may be transmitted to one or more other infected computers to the bot's master.

Further enhancement to malware detection effectiveness while avoiding false positives is desirable of course, particularly as malware developers continue to create new forms of exploits, including more sophisticated bots and botnets, having potentially serious consequences.

SUMMARY

Techniques may automatically detect bots or botnets running in a computer or other digital device by detecting command and control communications, called "call-backs," from malicious code that has previously gained entry into the digital device. Callbacks are detected using a distributed approach employing one or more local analyzers and a central analyzer. The local analyzers capture packets of outbound communications, generate signatures from header information, and analyze the captured packets using various techniques. The techniques may include packet header signature matching against verified callback signatures and deep packet inspection (e.g., dark domain analysis and dark IP address analysis). The central analyzer receives signatures and associated packet header information from the local analyzers, checks for signature matches in a global signature cache, and may, in some embodiments, perform further analysis, for example, host reputation analysis with respect to the packet headers. The central analyzer employs machine learning to generate callback probability scores associated with each packet header whose information is received. The scores may indicate callback status, i.e., whether the packet headers are associated with callbacks and thus malicious. The central analyzer may then update the global signature cache with that status, and generally coordinates among the local analyzers, including sharing verified callback signatures with them.

In an illustrative embodiment, a local analyzer performs the following steps: A) forming a first signature based on a preferably partially masked header of a captured network packet for use as an index into a local signature cache and into a local event/anomaly database, where each captured packet may represent an event; B) performing a deep packet inspection of the captured network header; C) subscribing to a service provided by a central analyzer located remotely from the local cache and (for example, coupled thereto by a network) for determining, based on a global signature cache lookup and at least in part on results (called anomalies) from the deep packet inspection performed by the local analyzer on the captured network packet, whether the first signature corresponds to a malware callback; and D) responsive to a message received from the central analyzer, storing results of the central analyzer's determination in the local signature cache if the current signature corresponds to a malware callback and updating the local event/anomaly database.

In an illustrative embodiment, a central analyzer performs the following steps: A) receiving a first signature representative of a captured network packet from a local analyzer, B) using the received first signature as an index to find a match in a global signature cache and to update a global event/anomaly database, where each captured packet may represent an event and where anomalies are identified by analysis performed by the local cache with respect to the captured network packet; C) absent a match, performing further analysis, in at least some embodiments including, for example, a reputation analysis, e.g., using online resources; D) determining, based at least in part on the anomalies and the results of the analysis, if any, by the central analyzer, whether the first signature corresponds to a malware callback; E) storing match information and/or results of the determination in the global signature cache if the current signature corresponds to a malware callback and updating the global event/anomaly database; and F) sending a message to the local analyzer with the match information and/or results of the determination.

Detecting callbacks as described herein as a keystone of malicious attack and exploit analysis may permit embodiments of the invention to detect disparate forms of malware, and even families of polymorphic virus that use the same communication mechanisms to obtain instructions and other communications in furtherance of their nefarious purposes.

BRIEF DESCRIPTION OF THE DRAWINGS

The invention will be more fully understood with reference to the following detailed description in conjunction with the drawings, of which.

DETAILED DESCRIPTION

I. Introduction

Figure 1A:
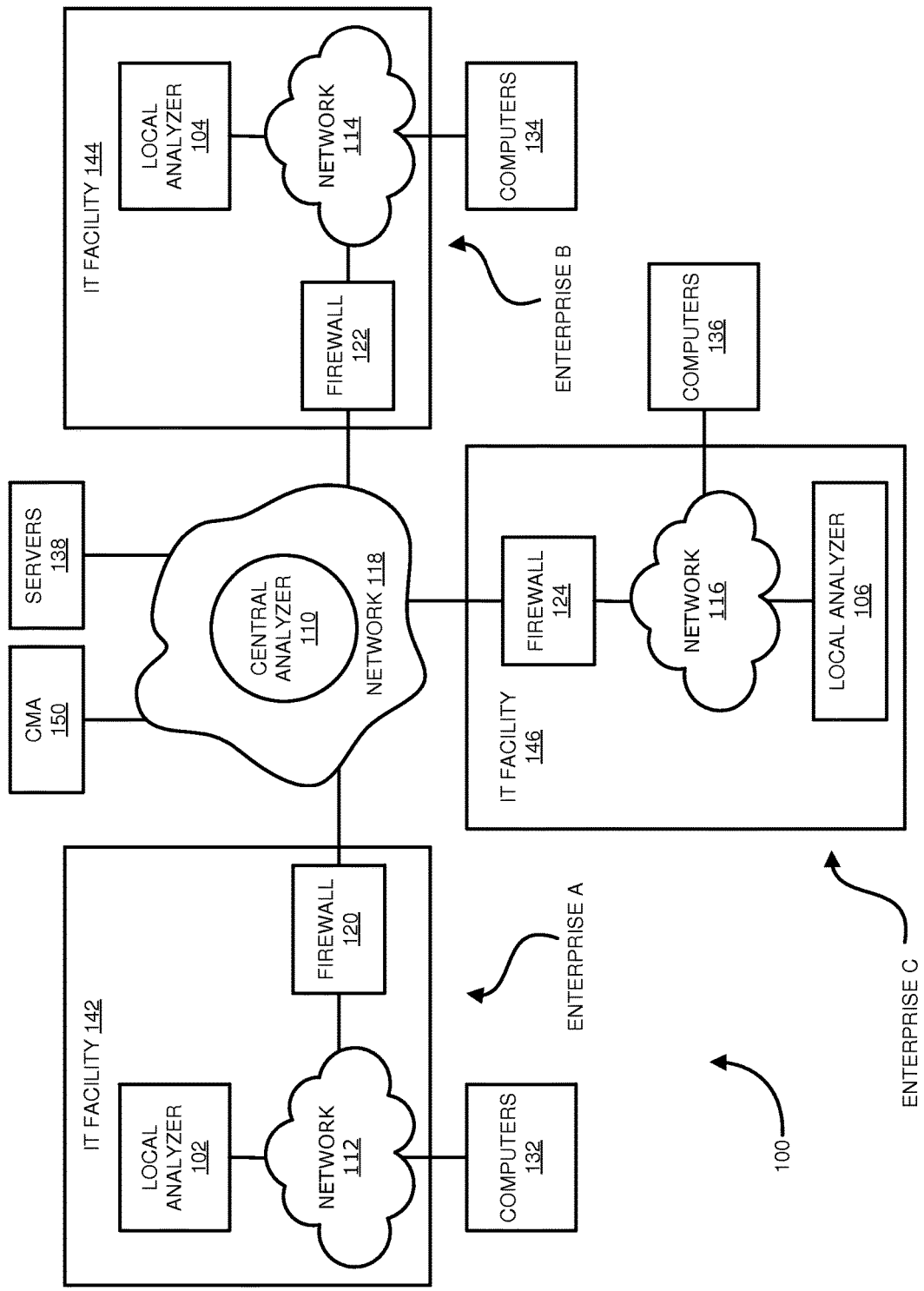
FIG. 1A is an architecture-level block diagram of a distributed callback detection and analysis system, in accordance an illustrative embodiment of the invention.

Generally speaking, a bot is a type of (or part of) an active infiltration attack, often installing or operating in a two-step process. The first step is the initial infection, which may be a typically small package of malicious code (malware) whose function is to compromise the infected device. The second step involves that malware obtaining instructions as to malicious activity it is to perform, including possibly downloading additional malware, e.g., over the Internet or sending messages or data from the infected computer. This second step often involves establishing a CnC channel over which it may send a message providing its status or requesting CnC communications (instructions). This is called a "callback," and the exchange of such communications may be referred to as callback activity.

The CnC may use an undocumented entry point, or subvert and use a documented entry point to request instructions over a CnC channel, which are often transmitted over the same or other channels. Often the CnC channel is established via a non-standard port provided by the operating system of the infected device. In so doing, the bot bypasses normal security and authentication mechanisms, and thereby achieves unauthorized egress from the computer. A hallmark of bots is the manner by which they utilize egress points for callbacks is designed to remain undetected to the digital device's user and system/network administrators.

To achieve detection of callback activity, embodiments of the invention provide a distributed callback detection and analysis system, which may include one or more local analysers and a central analyser, often cloud based. The local analysers may each perform (a) a signature match, comparing a signature generated from a current HTTP header against those generated from HTTP headers previously determined to be associated with callback activity; and (b) deep packet inspection of received HTTP packets (i.e., packets containing HTTP messages), including, for example, one or more of protocol compliance analysis, dark domain analysis and dark IP address analysis. If the signatures match, the current HTTP header is associated with callback activity and an alert may be generated. If the signatures do not match but the deep packet analysis finds suspicious anomalies (e.g., protocol non-compliance or unconventional syntax or content, or destination is a dark domain or dark IP address), the current HTTP header and related communication information is provided to the central analyser. The central analyser may perform additional evaluation, such as a reputation analysis, for example, using on-line resources. Afterwards, a threat heuristic analysis may be performed, combining all the results from the local and central analyser to reach a probabilistic determination of whether the suspicious content should be declared malicious.

In some embodiments, the local analyser operates to sniff network traffic for HTTP packets, extract HTTP headers therefrom, form signatures of preferably select HTTP header fields, and perform a look-up of those header signatures to determine whether those headers have been analysed previously for potential indicators of an attack. If the signatures were previously associated with an attack, an alert may be immediately issued. The local analyzer may also perform a deep packet inspection. This may entail evaluating information contained within fields of the headers for protocol anomalies, suspicious header content, suspicious domain identifiers (dark domain analysis), and/or suspicious destination IP addresses (dark IP address analysis). Based on this evaluation, the local analyzer may decide whether the header information indicates malware (e.g., a bot) is present. Upon finding suspicious anomalies, the local analyser reports the suspect (e.g., the header signatures and, in some embodiments, metadata related to the communication) to a central analyser to whose services it subscribes for further evaluation and centeralized coordination with other local appliances. The central analyser may perform additional evaluation, such as a reputation analysis, for example, using on-line resources. Afterwards, a threat heuristic analysis may be performed, combining all the results from the local and central analyser to reach a probabilistic determination of whether the suspicious content should be declared malicious. To that end, the threat heuristic analysis may employ machine learning or training to perform threat analytics, for example, by compare the current analysis results with those from labelled malware and labelled non-malware samples. The threat heuristics analysis yields a threat probability for the current results. If the threat probability exceeds a predetermined threshold, an alert may be issued.

Throughout this specification, reference is made to HTTP. HTTP is an application layer protocol widely used for data communications for the World Wide Web. The Request for Comment (RFC) 2616: Hypertext Transfer Protocol—HTTP/1.1 specification sets out the semantics and other requirements for HTTP communications. HTTP resources are identified and located on a network by Uniform Resource Locators (URLs). Employing a client-server computing model, HTTP provides data communication for example between one or more web browsers running on computers or other electronic devices constituting the clients, and an application running on a computer or other electronic device hosting a website constituting the server. HTTP is a request-response protocol. For example, a user clicks on a link on their web browser, which sends a request over the Internet to web server hosting the website identified in the request. The server may then send back a response containing the contents of that site, including perhaps text and images for display by the user's browser.

The HTTP specification defines fields of HTTP headers, which are components of HTTP messages used in both requests and responses, and define the operating parameters of an HTTP communication or transaction. The header fields are transmitted after the request or response line, which is the first line of a message. As noted, the HTTP semantics are well defined, for example: Header fields are colon-separated, name-value pairs in clear-text string format. Each field is terminated by a carriage return (CR) and line feed (LF) character sequence. The end of the header fields is indicated by an empty field, resulting in the transmission of two consecutive CR-LF pairs. Variations from the specified semantics constitute anomalies. Also, the HTTP specification allows users to define their own fields and content, though often practice and convention dictate how those fields are used and what content may be expected. Variations from those conventions may also be deemed anomalies. Finally, sometimes malware authors will insert content into the fields, such as malware names or other tell tail malware descriptors or indicators, which serve as strong evidence of malicious activity. These too will be deemed anomalies for purposes of this specification.

For communication, an HTTP header is added to an HTTP message, and placed in a TCP/UDP message (sometimes more than one TCP/UDP message per HTTP message), which, in turn, is encapsulated (as payload) in an IP Datagram, which is encapsulated (as payload) in a Layer 2 Frame, which is sent as a signal over the transmission medium as a string of binary numbers. Each Layer 2 Frame has, in order, a Layer 2 header, an IP header, a TCP or UDP header, a HTTP header, HTTP data, etc., and finally a Layer 2 footer. Taking this explanation one step further, the IP layer includes in its header the information necessary for the packet to find its way to its final destination. More specifically, for computer-to-computer communication across networks, a source device forms packets for transmission by placing the IP address of the destination computer in the IP header of each packet involved in a communication session. The data packets are encapsulated as noted above and placed on the network and routed across the network to the destination having the specified IP address. In this specification, reference will be made to "packets," which shall be used in its broadest sense to include, without limitation, messages, datagrams, frames and, of course, packets, unless the context requires otherwise. Accordingly, packet capture techniques may yield the HTTP header, IP address of the destination of an IP packet as well as domain identifiers from the URL of HTTP headers included in the IP packets.

II. Distributed Detection and Analysis System Architecture

FIG. 1A depicts an illustrative architecture of a distributed callback detection and analysis system 100, which is designed to detect callbacks from malicious code, e.g., bots, in accordance with an embodiment of the invention, and to provide the results of that analysis to facilitate detection of other bots or even botnets. The system 100 may even detect 'zero day' malware attacks. The term "zero day" is used to denote malware that has not been previously encountered and are previously unknown. The distributed detection and analysis system 100 is illustrated as employing a number of local analyzers 102, 104, 106 and a cloud-based or central analyzer 110. Each local analyzer 102, 104, 106 monitors outbound communications to perform local analysis, signature matching, and first stage filtering, for example, using locally stored filtering parameters and rules to detect evidence of callback communications within the monitored traffic. Even if the analysis performed by each local analyzer 102, 104, 106 fails to find significant evidence of callback communications, it may identify specific packets within the traffic as callback suspects for further analysis purposes. The central analyzer 110 is coupled for communication with the local analyzers 102, 104, 106 via one or more networks 112, 114, 116, 118. The central analyzer 110 provides globally based signature matching, a second stage filtering of the monitored traffic, for example, using rules and global parameters and an Internet search to detect evidence of callbacks for callback suspects furnished by the local analyzers 102, 104, 106. The central analyzer 110 also distributes results of its analysis to all of the local analyzers 102, 104, 106 to enhance local analyses and first stage filtering of future traffic.

The outbound communications monitored by the local analyzers 102, 104, 106 may contain network packets, which are normally expected to be in conformance with the HTTP protocol or other suitable protocol. While HTTP will be used as an example of a suitable protocol through the specification, the invention may be practiced with any standard protocol, preferably an application-level protocol for data communication. The network packets may be sent over networks 112, 114, 116 by computers 132, 134, 136 to one or more other computers 132, 134, 136 situated, for example, on the trusted side of the respective firewalls 120, 122, 124. The network packets may also be sent by computers 132, 134, 136 over networks 112, 114, 116 and network 118 to one or more computers, such as server 138, situated on the untrusted side of the firewall 120, 122, 124, and possibly at geographically distant location. Each local analyzer may be deployed at a respective IT facility 142, 144, 146 of an enterprise A, B, C. Each of the networks 112, 114, 116 may be proprietary networks, such as a LAN or WAN, and the network 118 may be a public network, such as the Internet. The networks 112, 114, 116, 180 may constitute, in various alternative embodiments, separate networks or sub-networks of a common network, for example. In a yet another alternative embodiment, the local analyzers 102, 104, 106 may be coupled with the central analyzer 110 via a dedicated communication link rather than a LAN or WAN.

While three local analyzers 102, 104, 106 coupled for operation with a single central analyzer 110 are shown in this figure for purposes of illustration and may be considered collectively as forming a local/global analyzer cell, the invention can be practiced with any number of local analyzers in a group within a single cell, where the number of analyzers is selected to be able sufficiently to monitor outbound communications under prevailing traffic conditions, with the group of local analyzers within the local/global analyzer cell being associated with the single central analyzer 110. Moreover, the local/global analyzer cell may be replicated throughout an enterprise or across multiple related or unrelated enterprises, so as to provide a scalable deployment. Moreover, in one embodiment, the central analyzer 110 of one local/global analyzer cell may be connected to a central analyzer 150 of a second local/global analyzer cell, and so forth so as to distribute results of its analysis to one or more other local/global analyzer cells to enhance filtering and detection of callbacks across two or more local/global analyzer cells.

One embodiment of the invention takes advantage of "software as a service" ("SaaS") principles of business, in which the central analyzer 140 may be a cloud-based server providing services to one or more service subscribers. In this environment, the local analyzers 102, 104, 106 may be considered clients that avail themselves of the services of the central analyzer 110 configured as a server and located, for example, within the Internet. In some embodiments, the services of a central analyzer 110 may be provided by an IT service provider on behalf of a number of customers that subscribe to its services, each of which having at least one local analyzer 102, 104, 106 either located on the customer's premised or coupled to the customer's trusted network and provisioned for providing local analysis. Alternatively, the central analyzer 110 and each of the local analyzers 102, 104, 106 may be deployed as an appliance (i.e., a dedicated electronic device serving to detect malware) integrated as part of a local or enterprise-wide network, as a firewall or other network device adapted to provided malware detection as described herein, or as a network endpoint adapted to provide malware detection as described herein, and systems may deploy any one or a combination of the foregoing implementations.

Figure 1B:
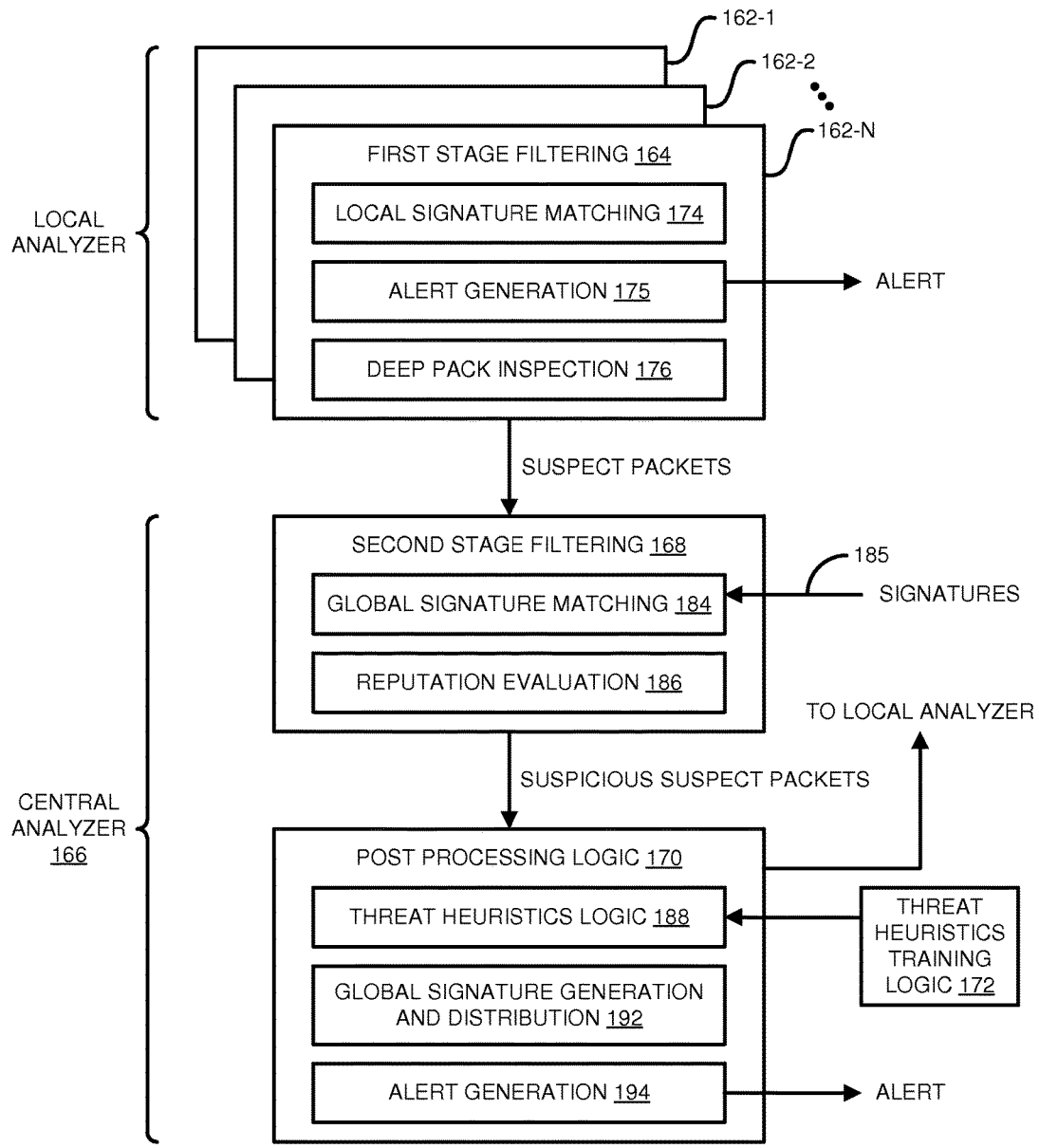
FIG. 1B is a block diagram, partially in flow chart form, of the distributed callback detection and analysis system of FIG. 1A, in accordance an illustrative embodiment of the invention.

FIG. 1B is an exemplary block diagram of logic implementing a distributed callback detection and analysis (DCDA) system 160, in accordance with an illustrative embodiment of the invention. The DCDA system 100 of FIG. 1A may be implemented in accordance with FIG. 1B. As shown, the DCDA system 160 has local analyzing logic ("local analyzers") 162-1, 162-2, . . . 162-N (N>1) implementing a first stage filtering logic 163, and a central analyzing logic ("central analyzer") 170 implementing a second stage filtering logic 172, post processing logic 170, and threat heuristics training logic 172.

The first stage filtering logic 164 has a local signature matching logic 174, an alert generation logic 175, and a deep packet inspection logic 176. The local signature matching logic 174 receives a stream of captured packet headers and, for each, generates a signature from information contained in the header. The signature may be hash of at least portions of the information contained in the header. In other embodiments, the signature may be an identifier associated with the header, and may or may not be based on the information depending on the embodiment. Then, the local signature matching logic 174 accesses a repository (not shown in this figure), such as a cache, of signatures of previously evaluated and confirmed malware to determine whether the current header signature matches any of those for malware previously evaluated. If a match is found, the alert generation logic 175 issues an alert. The deep packet inspection logic 176 analyses the packet headers of captured packets for anomalies or other evidence indicating the packets may constitute malware. The deep packet inspection 176 may include protocol anomaly matching, as described elsewhere herein. In some embodiments, if the deep packet inspection logic 176 does not detect any anomalies (or, in some embodiments, only de minimus or minor ones), the packet may be dropped from further analysis. If the local signature matching logic 174 finds no match but the deep packet inspection 176 finds anomalies, the current packet header is deemed a malware "suspect" or "suspect packet." As such, the current packet header is provided, along with its corresponding header signature, for further analysis by the second stage filtering logic 168 of the central analyzer 166.

In some embodiments, the local signature matching logic 174 may process captured packets prior to the deep packet inspection logic 176 examining the captured packets, in which case the deep packet inspection logic 176 need only examine packets whose signatures did not have a match. In other embodiments, the deep packet inspection logic 176 may examine captured packets before the local signature matching logic 174 performs its cache lookup, in which case the deep packet inspection's cache lookup need only be performed with respect packet headers having anomalies. This may prove beneficial from a time and resource conservation perspective. Of course, they may also operate in a parallel or overlapping fashion in some embodiments.

The second stage filtering logic 168 includes a global signature matching logic 184 and a host reputation evaluation logic 186. As used herein, "global" signifies that the central analyzer's logic processes data obtained from all local analyzers 162-1, 162-2, . . . 162-N associated with the central analyzer 166. That association between the local analyzers 162-1, 162-2, . . . 162-N and the central analyzer 166 may be established on a business basis, where the users of the local analyzers 162-1, 162-2, . . . 162-N subscribe to and, in some cases, may pay a fee for the services (SaaS) of the central analyzer 166. The global signature matching logic 184 operates in a similar fashion to the local signature matching logic 174 as described above, except, in this case, the repository or cache (not shown in this drawing) includes a potentially more current list or even a more comprehensive list of globally identified malicious packet header signatures. In some embodiments, the global cache may have a more comprehensive list of malicious packet header signatures because the local cache may have retired entries after a certain length of time or the global cache may receive signatures from other local analyzers (not shown) that are not subscribers to the central analyzer 166 or from other central analyzers (not shown), which have not yet been shared with the local analyzers 162-1, 162-2, . . . 162-N. If the global signature matching logic 184 finds a match, it may, depending on the embodiment, take the following steps: (a) forward the current packet header and signature to the post processing logic 170 for further analysis, e.g., for forensics purposes; (b) initiate an alert, and forward a malware warning to all local analyzers 162-1, 162-2, . . . 162-N so that the local analyzers may update their local cache; and/or (c) proceed with evaluation by the reputation evaluation logic 186. If the global signature matching logic 184 does not find a match, the packet header is provided to the reputation evaluation logic 186. In alternative embodiments, the reputation evaluation logic 186 may process the packet header before the global cache look-up, or in parallel therewith.

The reputation evaluation logic 186 may evaluate the reputation of the host by performing an on-line or "live" investigation of the reputation of the destination of the URL or IP address of the destination of the packet. For example, if the URL is associated with a reputable business, that would be regarded as low risk. However, if the URL is associated with a dubious web site, possible a malicious web site, the reputation evaluation logic 186 would mark the packet as having a suspicious attribute or anomaly (for example, in an event/anomaly database). The packets so marked may be referred to as "suspicious suspect packets."

The post processing logic 170 includes a threat heuristics engine or logic 188, a global signature generation and distribution logic 192, and alert generation logic 194. The threat heuristics logic 188 receives the results (attributes) from a second stage filtering logic 168, and the packet header signature and related information (e.g., anomalies, metadata) from the analytics performed by the first stage filtering logic 164.

The threat heuristics logic 188 performs a threat heuristic analysis to verify whether the captured headers contain bootkits. The threat heuristics logic 188 is configured to calculate a probability that the packet is associated with a callback and thus malicious. To that end, the threat heuristics analysis may advantageously employ principles of machine learning. Machine learning refers to a process or system that can learn from data, i.e., be trained to distinguish between "good" and "bad", or in this case, between malicious and non-malicious, and classify samples under test accordingly. The core of machine learning deals with representation and generalization, that is, representation of data instances (e.g., the anomalies and other analytical results, which can be collectively called "attributes"), and functions performed on those instances (e.g., weighting and probability formulas). Generalization is the property that the process or system uses to apply what it learns on a learning set of known (or "labeled") data instances to unknown (or "unlabeled") examples. To do this, the process or system must extract learning from the labeled set that allows it to make useful predictions in new and unlabeled cases.

For machine learning, the DCDA system 160 may operate in a training mode and in an operational mode. In a training mode, the DCDA system 160 employs a threat heuristics training logic 172 to subject known samples (labeled samples) of callback communications and known samples of clean or non-malicious communications to analysis to calibrate the threat heuristics logic 188 for probability scoring of callbacks and non-callback activities. To accomplish this, the threat heuristics training logic 172 may submit malicious and clean samples to one of the local analyzers 162-1, 162-2, . . . 162-N and a central analyzer 166. In some embodiments, the threat heuristics training logic 172 may employ a special forensics system (e.g., with a single local analyzer and a central analyzer as respective back-end and front-end components on the same controller, e.g., controller 600 of FIG. 6). In alternative embodiments, the threat heuristics training logic 172 may test the malicious and clean samples each time it calibrates a different DCDA system, or it may store the results of prior tests for use in future calibrations of DCDA systems. The threat heuristics training logic 172 may assign a probability score to each of the possible patterns resulting from testing the malicious and clean samples, which probability scores are indicative of whether a communication (e.g., a packet) constitutes a callback.

In an operating mode, the threat heuristics analysis logic 188 combines all attributes with respect to a current packet under test (unlabeled, of course) to form a current pattern containing potential indicators of callback activity. Then, the threat heuristics analysis logic 188 compares that pattern and/or, in some embodiments, each and every one of the attributes contained therein, with those obtained during the training mode. Where attributes are separately analyzed, the threat heuristics analysis logic 188 may assign weights based on experience during training to attributes that are deemed more closely associated with malware. It then assigns a probability score to each of the possible patterns, and/or, in some embodiments, to each of the attributes within each pattern as to its likelihood of appearing in a malicious and/or clean sample based on the learned probability scoring. This may involve determining how closely a pattern of attributes in an unlabeled sample compares to a labeled sample, using a proximity calculation based on the probability of encountering each attribute in a malware or non-malware pattern. The end result may be a composite probability score for the current packet under test. The score is indicative of whether the current packet under test is associated with a callback and thus malware. If the score exceeds a pre-determined (e.g., learned or administrator set) threshold, for example, the current packet is deemed malicious. Accuracy in prediction of malware will depend on the selection and number of relevant attributes, the selection of weights to be assigned to each, the comparison process used, and the quality of training.

The global signature generation and distribution logic 192 receives the results from the threat heuristics logic 188, that is, depending on the embodiment, a probability score (e.g., from 1 to 10, where 10 is the highest probability) indicating whether the current packet header is associated with or contains malware or a declaration that the packet header is or is not (i.e., a binary determination) associated with or contains malware. The global signature generation and distribution logic 192 provides an update to the local analyzers 162-1, 162-2, . . . 162-N including the score and/or determination from the threat heuristics logic 170. The local analyzer may then update their event/anomaly databases and caches with this information. If their caches already have the signature, it is now marked as being associated with malware. The alert generation logic 194 may issue a notice, report, warning, or other alert to a security administrator in the event that the threat heuristics logic 188 concludes the probability score is above a pre-determined, and, in some embodiments, user or administrator set threshold or declares the current packet is associated with or contains malware.

III. Local Analyzer

Figure 2:
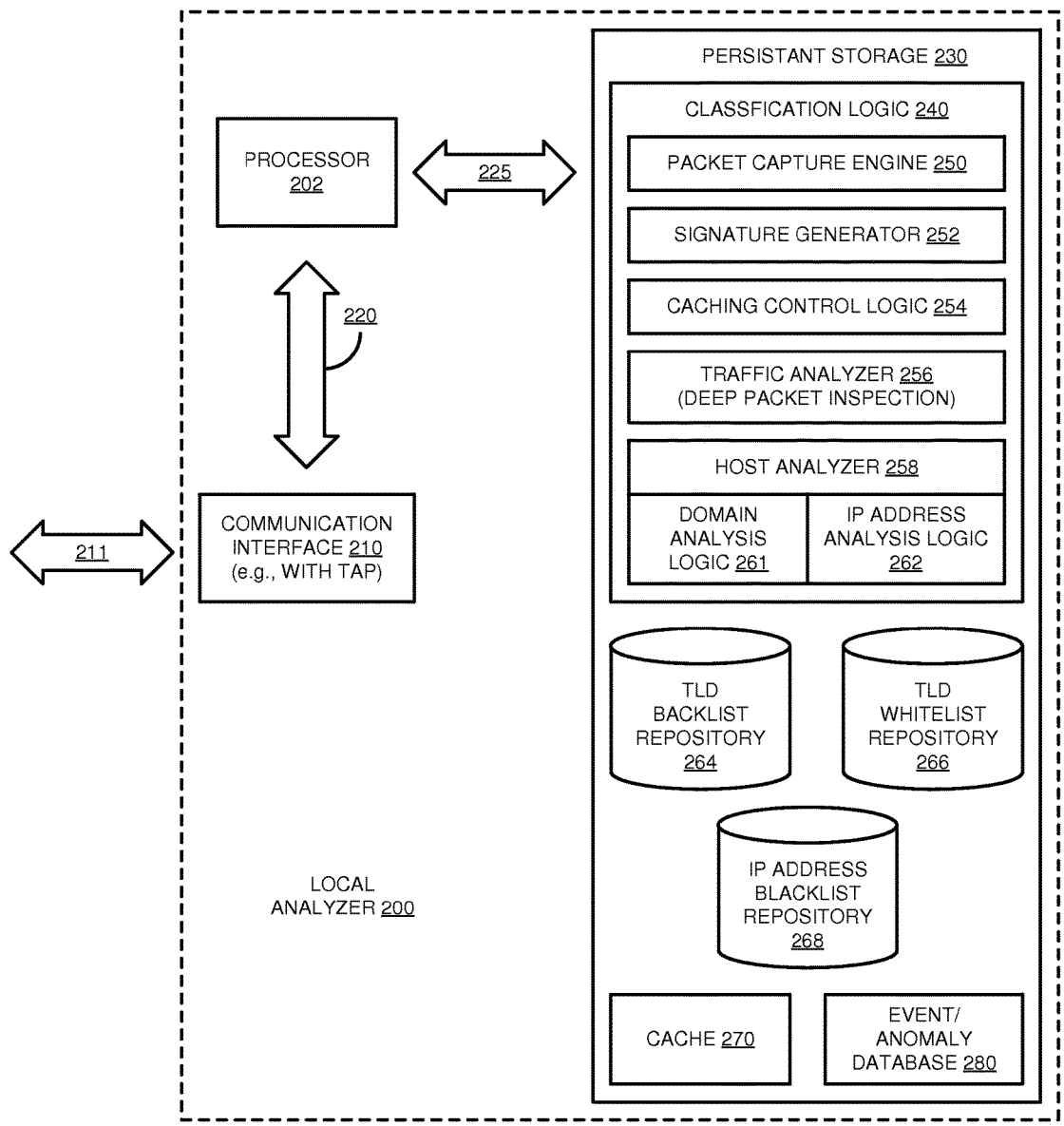
FIG. 2 is a block diagram of a local analyzer of FIG. 1A and FIG. 1B, in accordance with an illustrative embodiment of the invention.

FIG. 2 is an exemplary block diagram of logic implementing a local analyzer 200. In some embodiments, each of the local analyzers 104, 106, 108 of FIG. 1A may be so configured. The local analyzer 200 has one or more processors 202 that are coupled to communication interface logic 210 via a first transmission medium 220. Communication interface logic 210 enables the local analyzer 200 to monitor network traffic, for example, over a communication link, such as network 112, 114, 116 of FIG. 1A. Communication interface logic 210 may also permit communications from the local analyzer 200 directly or indirectly over a communication link, such as a private and/or public network, with other electronic devices. According to one embodiment, communication interface logic 210 may be implemented as a physical interface including one or more ports for wired connections. Additionally, or in the alternative, communication interface logic 210 may be implemented with one or more radio units for supporting wireless communications with other electronic devices over a wireless network. The persistent storage 230 also includes a TLD black list repository 264, a TLD white list repository 266, an IP blacklist repository 268, a cache 270 and an event/anomaly database 280. In some embodiments, the cache 270 may be integrated with the event/anomaly database 280 and both may be stored in memory or mass storage.

Processor 202 is further coupled to persistent storage 230 via transmission medium 225. According to one embodiment, persistent storage 230 may include classification logic 240, which in turn may include packet capture engine 250, signature generator 252, caching control logic 254, traffic header analyzer 256 for deep packet header inspection, host analyzer 258 for domain based host analysis and IP based host analysis. The persistent storage 230 may also include a TLD blacklist repository 264, an event/anomaly database 266, an IP blacklist repository 268, and a local cache 270. Of course, when implemented as hardware, the local classifier 240 would be implemented separately from persistent memory 230.

Packet capture engine 250 may be implemented using known packet capture or "PCAP" techniques, for example, in a packet capture engine or packet replay tool (not shown). The packet capture engine 250 may capture packets travelling over a network, such as network 112, 114, 116 of FIG. 1, e.g., by monitoring and capturing traffic at select I/O ports. In some embodiments, packets may be captured using a port mirroring or exchange flow mirroring technique. The packet capture engine 250 permits configuring of packet filters, which may be employed to limit the number of packets captured using flow mirroring. Captured packets may be stored in an event/anomaly database 280 in persistent storage 206, or other storage associated with the packet capture engine 250 for later analysis. Each such captured packet may be considered a separate event and a record may be opened for each event in the event/anomaly database 280.

Signature generator 252 may be configured to received packet headers from the PCAP engine 250, strip off parameter values contained in the headers, generate a hash (e.g., using Md5sum) of the remaining fields of the headers (sometimes referred to as a partially-masked PCAP), and store the resulting hash value along with the packet header in the event/anomaly database 206 as its corresponding signature. The parameter values stripped off by the signature generator 252 may contain personal or proprietary information of a nature that would render sharing of such information with geographically remote systems (possibly situated outside an enterprise and even in another country) undesirable. In other words, the signature generator 252 extracts select fields of characters for use in forming the signature for the full packet header and discards the remaining characters as unneeded surplus for these purposes.

It may prove helpful to consider an example of signature generation from an HTTP header:
POST/images/
greenherbalteagirlholdingcup250.php?v95=5&tq=gJ4WKIYVhX
HTTP/1.0
Connection: close
Host: greenherbalteaonline.com
Accept: */*
User-Agent: mozilla/2.0
data=14590234234GGDGD2A98JK==
The masked header (after removing parameter values from the URI and the stub data) might read as follows:
POST/images/
greenherbalteagirlholdingcup250.php?v95=*&tq=* HTTP/1.0
Connection: close
Host: greenherbalteaonline.com
Accept: */*
User-Agent: mozilla/2.0
The hash of this masked header may be used to identify the above-given communication for future references. An md5sum hash of the second header as shown above yields 1a7724e7a428b 1d865bb01847a8178d5.

The caching control logic 254 uses each header signature from the signature generator 254 as an index into the cache 270 of the persistent memory 230 to determine if an entry stored therein matches the header signature. The cache 270 is updated from time to time with results of the second stage filtering process, as will be discussed in detail below, so as to contain information regarding previously detected callbacks, accessible in the cache by header signatures. The cache 270 may contain the header signatures of verified callbacks, together with the associated "raw", partially-masked PCAP and, depending on the embodiment, other information regarding the callbacks, such as the indicators detected by the local analyzer 200 and/or central analyzer 110 (FIG. 1A) that marked the particular communications as callbacks. Alternatively, this other information may be stored in the event/anomaly database 280, and accessed using the signature as an index, for example. Thus, the cache 270 may be thought of as containing a blacklist of header signatures corresponding to communications that may constitute callbacks and may indicative malware. The callback analysis process as herein described deals with assessed probability that a particular communication constitutes a callback, and that assessment may change over time; therefore, it is preferably that the cache contain for these purposes only blacklist information. If the caching control logic 254 finds a match for the blacklist of header signatures stored in the cache 270 (i.e., a cache hit indicating or marked as malicious), the local analyzer 200 may issue an alert to the effect that the correspond communication contains a callback, and may declare the presence of malware (e.g., a bot) in the computer device that initiated the communication (source). The local analyzer 200 may also provide a report regarding the callback, including the signature and the corresponding partially-masked PCAP. If the caching control logic 254 does not find a match for the blacklist of header signatures stored in the cache 270 (i.e., a cache miss) or if any entry is not marked as malicious, the local analyzer 200 may continue with the analysis as described below.

Traffic header analyzer 256 is configured to use the partially-masked PCAPs from the packet capture engine 250 to detect anomalies in packet header fields that may indicate callback communications. The traffic header analyzer 256 may implement any of a variety of anomalies detection techniques involving packet header scanning, including for example: (a) identifying non-standard patterns (e.g., field contents) relative to the applicable protocol (e.g., HTTP), (b) identifying invalid header sequencing for the applicable protocol (e.g., HTTP), (c) comparing header structures with a whitelist and/or blacklist of prevalent, legitimate and/or illegitimate header structures for the applicable protocol (e.g., HTTP). For example, the fields of a header may be out of order or sequence, e.g., the host header, which should follow GET but may appear later, or particular fields may be omitted, due to mistake or carelessness by a programmer, who may be a malware author.

Host analyzer 258 employs domain analysis logic 261 to check the destination host domains identified in packet headers received from the packet capture engine 250 against a Top Level Domain (TLD) blacklist and/or a TLD whitelist stored in a respective TLD blacklist repository 264 and TLD whitelist repository 266 of persistent memory 230. The TLD blacklist repository stores blacklisted TLDs (top level domain) that are known or believed to be associated with malicious servers and/or with dynamic DNS services often used by bot "herders." For example, certain country designations of the TLDs may be associated at any particular time with a high incidence of malware authorship, possibly due to nation-state sponsored or condoned cyber-threat activities, and therefore encountering those TLDs may render the packets containing those TLDs suspicious/suspects for purposes of this invention.

The results from the analysis performed by the host analyzer 258 may correspond to any of several difficult outcomes. Matches of the destination host domains with the stored, blacklisted TLDs may result in the corresponding packet header signatures being designated as a highly suspicious callback suspect and sent to the central analyzer 110 (FIG. 1A) for further analysis. Matches with the entries in the stored TLD whitelist, particularly where those same destination host domains did not match entries in the stored, blacklisted TLDs, may result in the corresponding communication being considered safe and thus not as likely callback candidates. Of course, matches in both the blacklisted TLDs and whitelisted TLDs may be viewed as an error condition, and may result in the corresponding communication being sent to the central analyzer 110 (FIG. 1A) for further analysis and/or the error condition reported. Finally, matches in neither the blacklisted TLDs nor whitelisted TLDs may result in the corresponding communication being sent to the central analyzer 110 (FIG. 1A) for further analysis.

Host analyzer 258 may also employ an IP analysis logic 262 to check the destination host IP addresses contained in the full packet headers received from the packet capture engine 250 against an blacklist stored in a respective IP blacklist repository 268 of persistent memory 230. The IP blacklist repository stores IP addresses associated with (assigned to) known or suspected malicious servers or other electronic devices, e.g., IP addresses corresponding to verified sources of malicious attacks. Matches with the stored, blacklisted IP addresses result in the corresponding packet header signatures being designated as highly suspicious callback suspects and sent to the central analyzer 110 (FIG. 1A) for further analysis. On the other hand, in the event that a header destination address does not match any of the blacklisted IP addresses stored in the IP blacklist repository 268, the packets of the corresponding communication may be viewed as safe (i.e., unlikely callback suspects) and requiring no further analysis. In some embodiments, depending on traffic conditions, those communications may nonetheless be sent to the central analyzer 110 (FIG. 1A) for further analysis, of course.

IV. First Phase of Detecting Callbacks

Figure 3A:
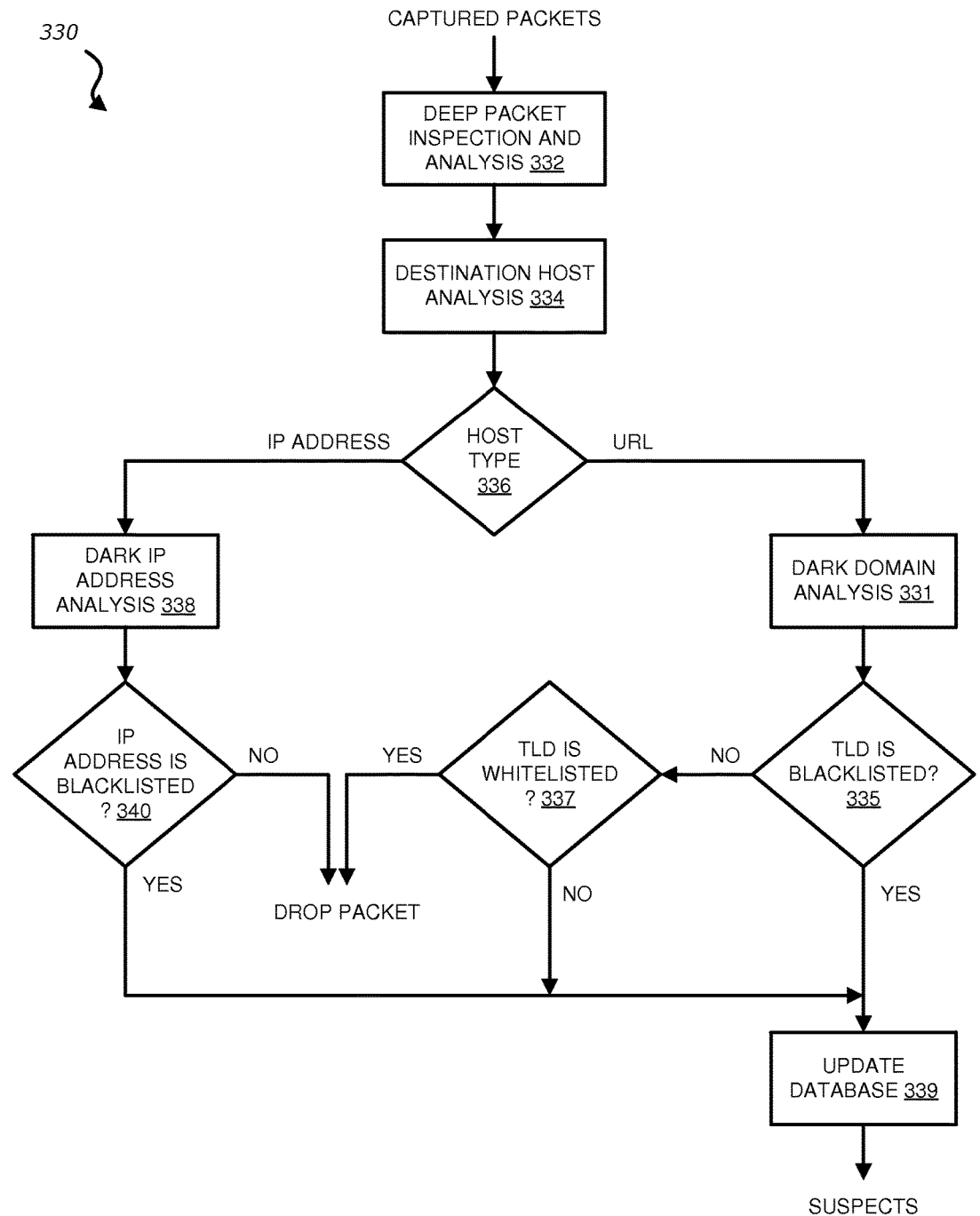
FIG. 3A is flow chart of a method for deep packet investigation as part of first-stage filtering of captured packets by the local analyzer of FIG. 2, in accordance with an illustrative embodiment of the invention.

FIG. 3A is a flow diagram illustrating a method 330 in accordance with an embodiment of the invention for conducting a deep packet inspection and analysis of headers captured, for example, by the packet capture engine 250 (FIG. 2), as part of a first stage filtering of captured packets. The method 330, in step 332, logic performs deep packet inspection (DPI) by examining each captured packet header, including its data, searching for non-compliance with applicable protocols (e.g, HTTP) and conventions. It may do so based on a number of pre-determined protocol-specific rules stored in the local analyzer. In step 334, logic performs destination ("host") based analysis. In step 336, logic determines the type of destination designated by the packet header. If the host is a web server identified by a URL for delivering webpages in response to requests from clients, for example, using HTTP, in step 331, logic performs a domain based analysis on the URL contained in the destination field of the packet header. In step 335, logic determines whether the TLD of that URL is blacklisted. If not blacklisted, in step 337, logic determines whether the TLD is whitelisted. This may be performed as described above. If the TLD is whitelisted the packet is deemed to be safe and analysis with respect to that packet ends. On the other hand, if the TLD is blacklisted as determined in step 335 or if the TLD is neither blacklisted or whitelisted as determined in steps 335 and 337, the event/anomaly database is updated to reflect this condition and the packet may be deemed a suspect and made available for further analysis, such as by the central analyzer. On the other hand, if the host type as determined by step 336 has an associated IP address designated in the packet header, in step 338, logic performs an IP address based analysis. In some embodiments, the IP address analysis is only performed in cases in which the host header contains hard code IP addresses instead of a domain. In step 340, logic determines whether the IP address is blacklisted. If the IP address is not blacklisted as determined in step 340, the packet is deemed to be safe and analysis with respect to that packet ends. On the other hand if the IP address is blacklisted, the method 330 proceeds to step 339, where logic updates the event/anomaly database to reflect this condition and the packet may be deemed a "suspect" and made available for further analysis.

Figure 3B:
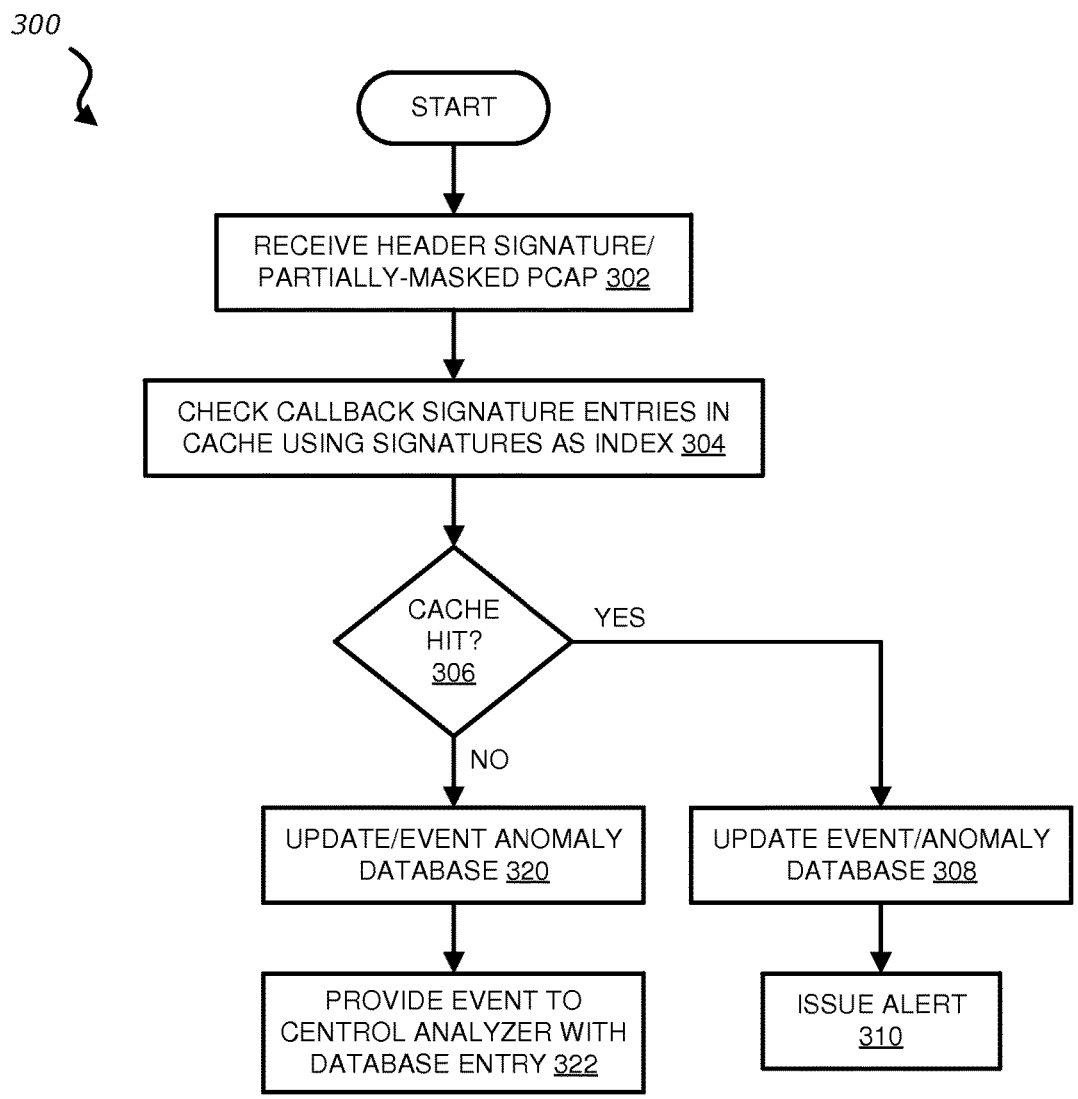
FIG. 3B is flow chart of a method for cache look-up as part of first-stage filtering of captured packets by the local analyzer of FIG. 2, in accordance with an illustrative embodiment of the invention.

FIG. 3B is a flow diagram illustrating a method 300 as may be performed by local analyzer 200 of FIG. 2 as part of a first phase of detecting callbacks in accordance with an embodiment of the invention. In step 302, logic generates a header signature from a partially-masked PCAP for each packet. In step 304, logic such as the caching control logic 254 checks each received header signature against callback signature entries in a callback cache or other repository using the received header signature as an index. In step 306, logic determines whether a cache hit or miss results. A cache hit signifying a matching entry may indicate that the signature is associated with malware. In other embodiments, a cache hit may require further examination of the cache entry (or possibly, depending on the embodiment, the corresponding event/anomaly database entry) to determine whether it is indicative or marked as malicious. If a cache hit, in step 308, an update is made into an event/anomaly database to reflect the occurrence or encounter of a callback event. Afterwards, in step 310, logic issues an alert and may provide additional information regarding the encountered callback to enable an administrator to take appropriate action. On the other hand, if a cache miss, the method 300 may next proceed to step 320, where logic updates the event/anomaly database accordingly. In step 322, logic sends the header signature along with related information, including, in some embodiments, the partially-masked PCAP, for example, contained in the event/anomaly database for further analysis, e.g., by a central analyzer 110 (FIG. 1A). Thereafter, the analysis by the local analyzer 200 with respect to the header under test ends and, if appropriate, a next header may be obtained pursuant to step 302, above.

Instead of relying solely on local analysis, based on locally gathered and stored information, regarding malware and their callbacks, the distributed detection and analysis system 100 (FIG. 1A) further employs a form of global analysis conducted by a central analyzer 110 (FIG. 1A) in collaboration with the local analyzer 200, as will be described next in greater detail. The central analyzer 110 may employ a number of different analytical techniques, including global callback caching, and on-line or "live" investigation of headers' destinations' reputations.

V. Central Analyzer

Figure 4:
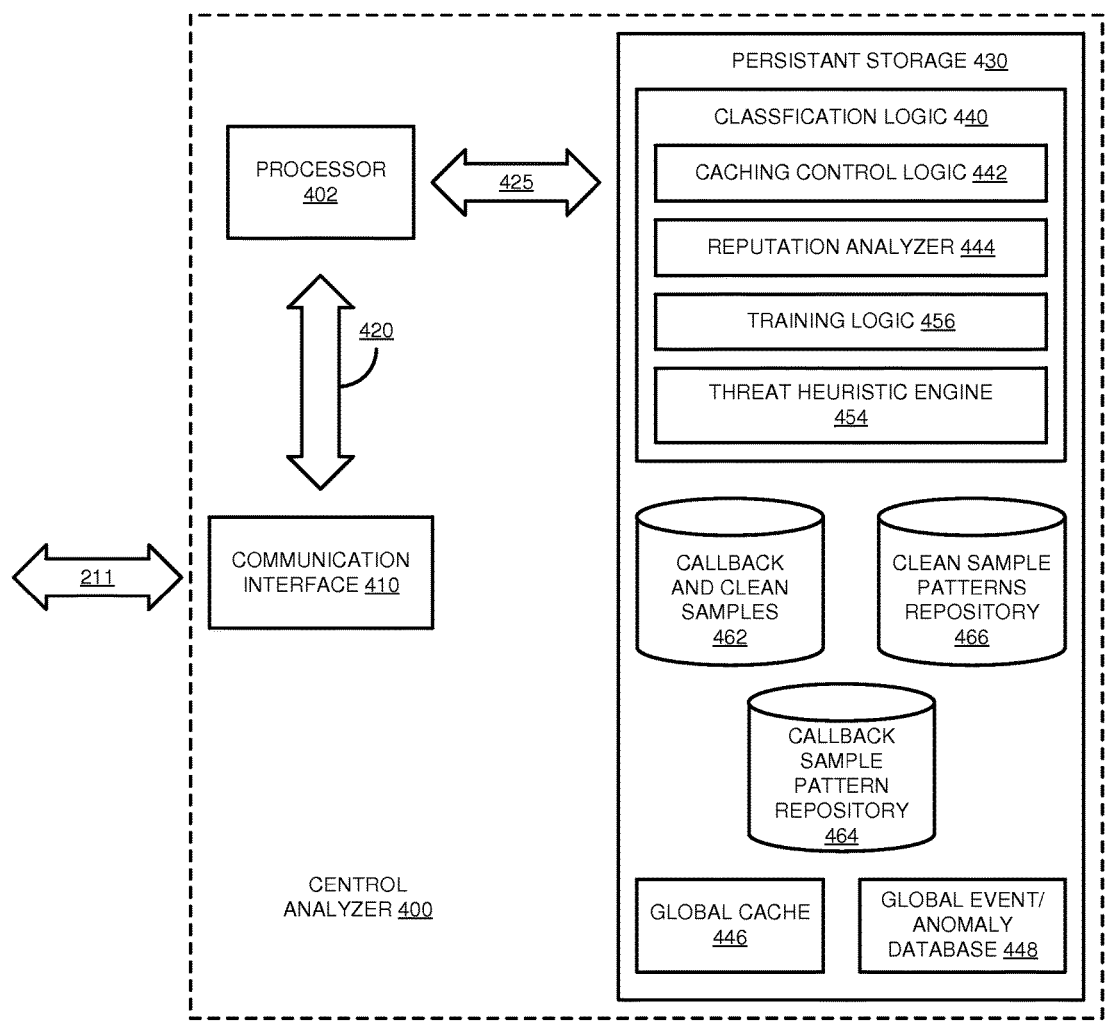
FIG. 4 is a block diagram of the cloud-based, central analyzer of FIG. 1A and FIG. 1B, in accordance with an illustrative embodiment of the invention.

FIG. 4 is an exemplary block diagram of logic that is implemented within a central analyzer 400 is shown. In some embodiments, the central analyzer 110 FIG. 1A may be so configured. The central analyzer 400 has one or more processors 402 that are coupled to communication interface logic 410 via a first transmission medium 420. Communication interface logic 410 enables the local analyzer 400 to monitor network traffic and communication, for example, over a communication link, such as network 118 of FIG. 1A. Communication interface logic 410 may also permit communications from the local analyzer 400 directly or indirectly over a communication link, such as a private and/or public network, with other electronic devices. According to one embodiment, communication interface logic 410 may be implemented as a physical interface including one or more ports for wired connections. Additionally, or in the alternative, communication interface logic 410 may be implemented with one or more radio units for supporting wireless communications with other electronic devices over a wireless network. Processor 402 is further coupled to persistent storage 430 via transmission medium 425. According to one embodiment, persistent storage 430 may include classification logic 440 (sometimes referred to herein as the "global classifier"), which in turn may include caching control logic 442 and a live analyzer 444. Of course, when implemented as hardware, the global classifier 440 would be implemented separately from persistent memory 430. Persistent Storage 430 also includes a global cache 446 and a global event/anomaly database 448. In some embodiments, the global cache 446 may be integrated with the event/anomaly database 448 and both may be stored in memory or mass storage.

Finally, persistent logic 430 includes a threat heuristic training logic 456 and a threat heuristics logic or engine 454. The operation of the foregoing components of the central analyzer 400 may be appreciated from the description of FIG. 1B and FIG. 5.

VI. Second Phase of Detecting Callbacks

Figure 5:
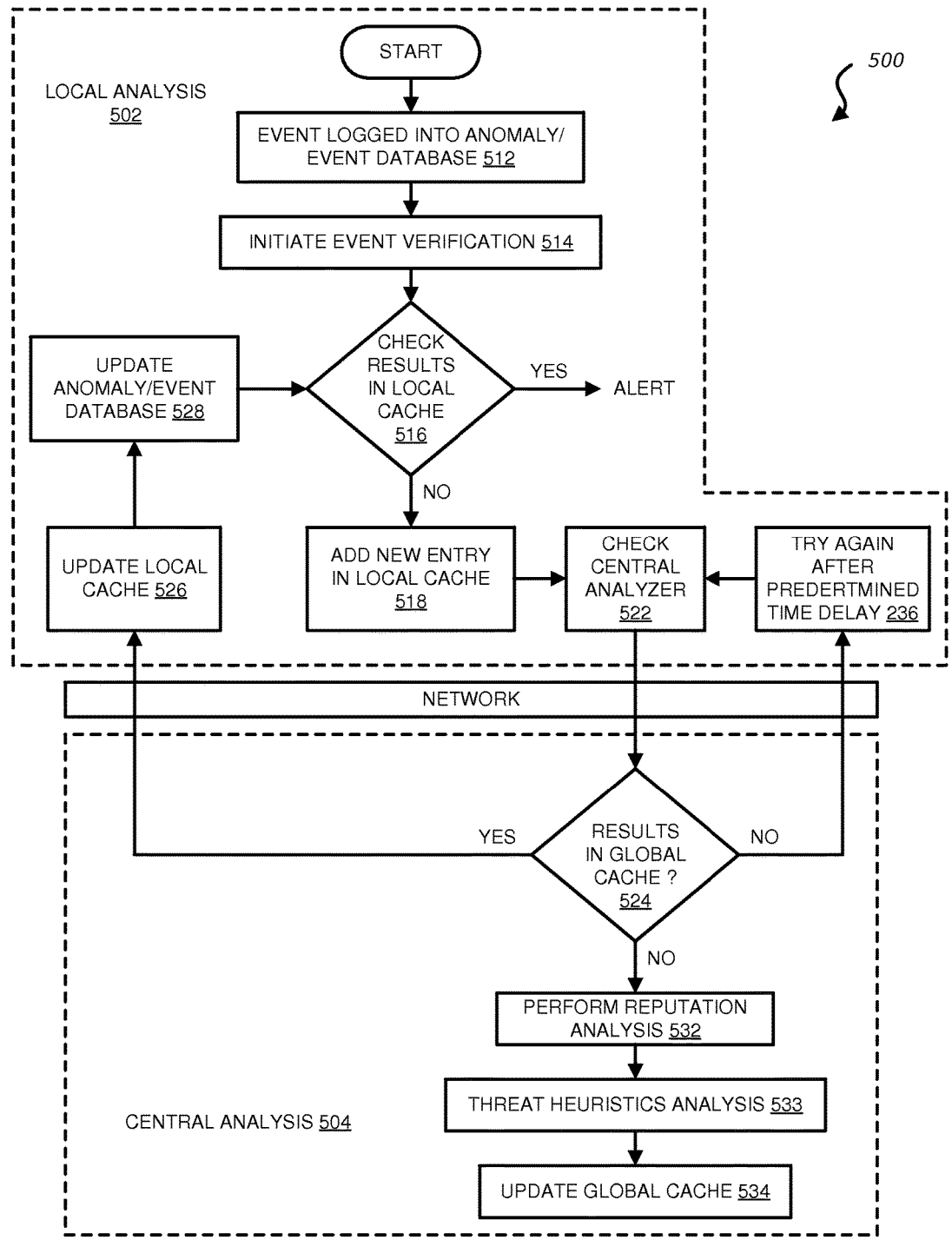
FIG. 5 is flow chart of a method for second-stage filtering of network traffic, depicting interaction of the local and central analyzers, in accordance with an illustrative embodiment of the invention.

FIG. 5 is a flow diagram illustrating a distributed method 500 for performing a second phase of detecting callbacks in accordance with an embodiment of the invention. Distributed method 500 includes a local analysis portion 502, as may be performed by local analyzer 200 of FIG. 2, and a centralized analysis portion 504, as may be performed by central analyzer 400 of FIG. 4. Starting with the local analysis portion 502, in step 512, logic logs an event into the local event/anomaly database. In step 512, logic initiates an event verification process. In step 516, logic checks results in the local cache. If the signature associated with the event matches an entry in the local cache marked as malicious (i.e., a cache hit), logic issues an alert. If the signature associated with the event is not in the local cache, i.e. a cache miss, the method 500 proceeds to step 518, where logic adds a new entry in the local cache to indicate the prior cache miss regarding a suspect. Next, in step 522, logic checks with the central analyzer. In so doing, the local analyzer makes the entry in the event/anomaly database available to the central analyzer. The local analyzer may do this by sending the event to the central analyzer or by waiting for the central analyzer to request newly added events (the "deltas") depending on whether the embodiment uses a respective "push" or "pull" technique. All communications between the local analyzer and the central analyzer may be encoded, using for example base64 or other known encoding technique.

Proceeding with the central analysis portion 504, in step 524, logic checks whether results corresponding to the event are in the global cache. If they are, that is, if a cache hit, in step 526, logic sends an update to the local cache to reflect the cache hit in the global cache, for example, indicating or marking a header signature as malicious. In step 528, logic modifies the events/anomaly database to reflect the cache hit in the global cache and issues an alert indicating that the suspect is malware. On the other hand, if step 524 finds that the corresponding results are not in the global cache, in step 532 logic invokes a live analysis engine, which assess the reputation of the header URL and or IP address based on on-line resources, such as by visiting the web site corresponding to the URL or other Web-based resources. In step 533, logic combines the results from analysis in the local and central analyzers. In step 534, logic updates the global cache with the results all of the heuristics analysis. Also, in some embodiments, if step 524 finds that the corresponding results are not in the global cache, in step 236, logic queues the event for a re-analysis by the central analyzer portion 504 after a period of time or when workloads are lower. By that time, it is possible that the global cache may have been updated with new results from the threat heuristics analysis.

Embodiments of the distributed callback detection system may be deployed as a stand-alone system or integrated into malware detection systems that examine and analyze other additional characteristics or attributes of the content that may indicate the presence of malware, such as, for example, malware signature scanning utilities or the afore-mentioned two-phase malware detection solutions. For example, the callback detection mechanisms described herein can be added to appliances and other systems for detecting malware, either by adding a virtual machine execution capability to such systems or by adding a local analyzer or a central analyzer functionality.

VII. Controller Architecture

Figure 6:
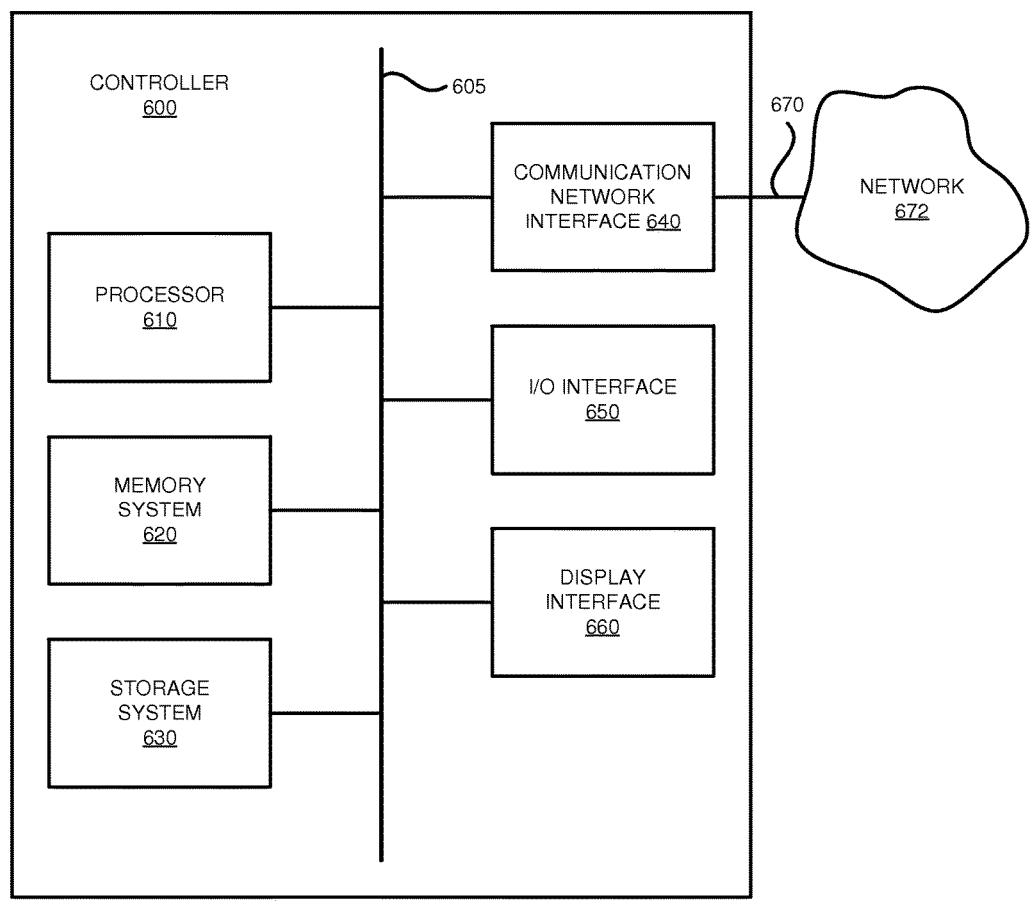
FIG. 6 is a block diagram of a computer network system deploying a malicious content detection system in accordance with an illustrative embodiment of the invention.

FIG. 6 illustrates a controller 600 in accordance with an illustrative embodiment. The controller 600 may implement the local analyzer 600 or the central analyzer 400. The controller 600 may have at least a processor 610, a memory system 620, and a storage system 630, which are all coupled via an interconnect, such as bus 605. The processor 610 executes instructions. The terms, "execute" and "run", as used herein, are intended broadly to encompass the process of carrying out instructions, such as software instructions. The processor 610 may be implemented as one or more processor cores, and may be provided as a single device or as separate components. In some embodiments the processor may be implemented as a digital signal processor or application specific integrated circuits, and firmware may provide updatable logic. The memory system 620 permanently or temporarily stores data. The memory 620 may include, for example, RAM and/or ROM. The storage system 630 also permanently or temporarily stores data. The storage system 630 may include, for example, one or more hard drives and/or flash drives, or other form of mass storage. The storage in memory 620 and storage 630 is not to be regarded as being transitory in nature. The repositories 130 (FIG. 1A) may be implemented as either memory 620 or storage system 630, or a combination thereof.

The controller 600 may also have a communication network interface 640, an input/output (I/O) interface 650, and a user interface 660. The communication network interface 640 may be coupled with a communication network 672 via a communication medium 670. The communications network interface 640 may communicate with other digital devices (not shown) via the communications medium 670. The communication interface 640 may include a network tap 840 (FIG. 8). The bus 605 may provide communications between the communications network interface 640, the processor 610, the memory system 620, the storage system 630, the I/O interface 650, and the user interface 660.

The I/O interface 650 may include any device that can receive input from or provide output to a user. The I/O interface 650 may include, but is not limited to, a flash drive, a compact disc (CD) drive, a digital versatile disc (DVD) drive, or other type of I/O peripheral (not separately shown). The user interface 660 may include, but is not limited to a keyboard, mouse, touchscreen, keypad, biosensor, display monitor or other human-machine interface (not separately shown) to allow a user to control the controller 600. The display monitor may include a screen on which is provided a command line interface or graphical user interface.

In various embodiments of the invention, a number of different controllers (for example, each of a type as illustrated and described for controller 600 may be used to implement the invention.

VIII. Computer System with Malicious Content Detection System

Figure 7:
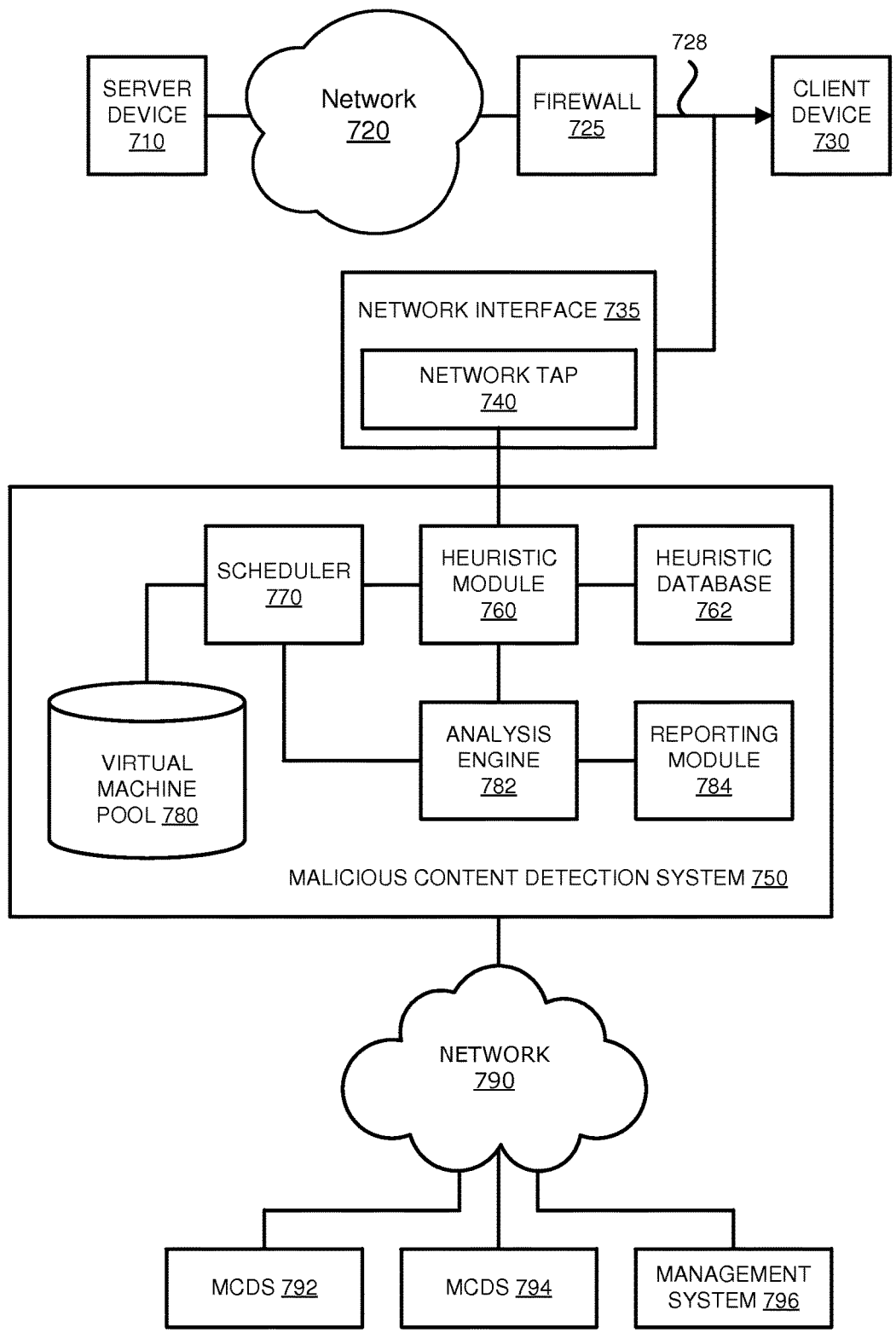
FIG. 7 is a block diagram illustrating of a processing system for implementing each of the local and central analyzers, in accordance with an illustrative embodiment of the invention.

FIG. 7 is a block diagram of an illustrative computer network system 700 having a malicious content detection system 750, a server device 710 and a client device 730, each coupled for communication via a communication network 720. The malicious network content detection system 750 may monitor exchanges of network content (e.g., Web content) in real-time rather than intercepting and holding the network content until such time as it can determine whether the network content includes malicious network content. The malicious network content detection system 725 may be configured to inspect exchanges of network content over the communication network 720, identify suspicious network content, and analyze the suspicious network content using a virtual machine to detect malicious network content.

The communication network 720 may include a public computer network such as the Internet, in which case a firewall 725 may be interposed between the communication network 720 and the client device 730. Alternatively, the communication network may be a private computer network such as a wireless telecommunication network, wide area network, or local area network, or a combination of networks.

The malicious network content detection system 725 is shown as coupled with the network 720 by a network interface 735, including a network tap 740 (e.g., a data/packet capturing device). The network tap 740 may include a digital network tap configured to monitor network data and provide a copy of the network data to the malicious network content detection system 725. The network tap 740 may copy any portion of the network data, for example, any number of packets from the network data. In embodiments where the malicious content detection system 750 is implemented as an dedicated appliance or a dedicated computer system, the network tap 740 may include an assembly integrated into the appliance or computer system that includes network ports, network interface card and related logic (not shown) for connecting to the communication network 728 to non-disruptively "tap" traffic thereon and provide a copy of the traffic to the heuristic module 750. In other embodiments, the network tap 740 can be integrated into a firewall (for example, using a SPAN port), router, switch or other network device (not shown) or can be a standalone component, such as an appropriate commercially available network tap. In virtual environments, a virtual tap (vTAP) can be used to copy traffic from virtual networks.

The malicious network content detection system 725 may include a heuristic module 760, a heuristics database 762, a scheduler 770, a virtual machine pool 780, an analysis engine 782 and a reporting module 784. The heuristic module 760 receives the copy of the network data from the network tap 740 and applies heuristics to the data to determine if the network data might contain suspicious network content. The heuristics applied by the heuristic module 760 may be based on data and/or rules stored in the heuristics database 762. The heuristic module 760 may examine the image of the captured content without executing or opening the captured content. For example, the heuristic module 760 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 760 flags network data as suspicious after applying a heuristic analysis.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques, as described hereinabove) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined. The heuristic module 760 may also provide a priority level for the packet and/or the features present in the packet. The scheduler 770 may then load and configure a virtual machine from the virtual machine pool 780 in an order related to the priority level, and dispatch the virtual machine to the analysis engine 782 to process the suspicious network content.

The heuristic module 760 may provide the packet containing the suspicious network content to the scheduler 770, along with a list of the features present in the packet and the malicious probability scores associated with each of those features. Alternatively, the heuristic module 760 may provide a pointer to the packet containing the suspicious network content to the scheduler 770 such that the scheduler 770 may access the packet via a memory shared with the heuristic module 760. In another embodiment, the heuristic module 760 may provide identification information regarding the packet to the scheduler 770 such that the scheduler 770, replayer 705, or virtual machine may query the heuristic module 760 for data regarding the packet as needed.

The scheduler 770 may identify the client device 730 and retrieve a virtual machine associated with the client device 730. A virtual machine may itself be executable software that is configured to mimic the performance of a device (e.g., the client device 730). The virtual machine may be retrieved from the virtual machine pool 780. Furthermore, the scheduler 770 may identify, for example, a Web browser running on the client device 730, and retrieve a virtual machine associated with the web browser.

The scheduler 770 may retrieve and configure the virtual machine to mimic the pertinent performance characteristics of the client device 730. The scheduler 770 may determine the features of the client device 730 that are affected by the network data by receiving and analyzing the network data from the network tap 740. Such features of the client device 730 may include ports that are to receive the network data, select device drivers that are to respond to the network data, and any other devices coupled to or contained within the client device 730 that can respond to the network data. In other embodiments, the heuristic module 760 may determine the features of the client device 730 that are affected by the network data by receiving and analyzing the network data from the network tap 740. The heuristic module 750 may then transmit the features of the client device to the scheduler 770.

The virtual machine pool 780 may be configured to store one or more virtual machines. The virtual machine pool 780 may include software and/or a storage medium capable of storing software. In one example, the virtual machine pool 780 stores a single virtual machine that can be configured by the scheduler 770 to mimic the performance of any client device 730 on the communication network 720. The virtual machine pool 780 may store any number of distinct virtual machines that can be configured to simulate the performance of a wide variety of client devices 730.

The analysis engine 782 simulates the receipt and/or display of the network content from the server device 710 after the network content is received by the client device 110 to analyze the effects of the network content upon the client device 730. The analysis engine 782 may identify the effects of malware or malicious network content by analyzing the simulation of the effects of the network content upon the client device 730 that is carried out on the virtual machine. There may be multiple analysis engines 750 to simulate multiple streams of network content. The analysis engine 782 may be configured to monitor the virtual machine for indications that the suspicious network content is in fact malicious network content. Such indications may include unusual network transmissions, unusual changes in performance, and the like. This detection process is referred to as a dynamic malicious content detection. The analysis engine 782 may flag the suspicious network content as malicious network content according to the observed behavior of the virtual machine.

In alternative embodiments of the invention, the heuristics module 760 or the analysis engine 782 may implement the local analyzer 200 of FIG. 2. In further alternative embodiments of the invention, the heuristics module 760 or the analysis engine 782 may implement or the central analyzer 400 of FIG. 4. Where the suspicious network data results from the heuristics module 760 or the analysis engine 782 perform as a local analyze, the results of the analysis may be provided to a central analyzer, as depicted at 400 in FIG. 4, for example, provided by management system 796 or located within the cloud depicted as network 790. In some embodiments, the suspicious network data may otherwise be provided to the scheduler 770, rather than a central analyzer, or in addition to being provided to a central analyzer.

The reporting module 784 may issue alerts indicating the presence of malware, and using pointers and other reference information, identify the packets of the network content containing the malware, for example, using the signatures described hereinabove. Additionally, the server device 710 may be added to a list of malicious network content providers, and future network transmissions originating from the server device 710 may be blocked from reaching their intended destinations, e.g., by firewall 725.

The computer network system 700 may also include a further communication network 790, which couples the malicious content detection system (MCDS) 750 with one or more other MCDS, of which MCDS 792 and MCDS 794 are shown, and a management system 796, which may be implemented as a Web server having a Web interface. The communication network 790 may, in some embodiments, be coupled for communication with or part of network 720. The management system 796 is responsible for managing the MCDS 750, 792, 794 and providing updates to their operation systems and software programs. Also, the management system 796 may cause malware signatures generated by any of the MCDS 750, 792, 794 to be shared with one or more of the other MCDS 750, 792, 794, for example, on a subscription basis. Moreover, the malicious content detection system as described in the foregoing embodiments may be incorporated into one or more of the MCDS 750, 792, 794, or into all of them, depending on the deployment. Also, the management system 796 or another dedicated computer station may incorporate the malicious content detection system in deployments where such detection is to be conducted at a centralized resource.

As described above, the detection or analysis performed by the heuristic module 760 may be referred to as static detection or static analysis, which may generate a first score (e.g., a static detection score) according to a first scoring scheme or algorithm. The detection or analysis performed by the analysis engine 782 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious or should be declared or considered with high probability of malicious.

Furthermore, detection systems 750 and 792-794 may deployed in a variety of distributed configurations, depending on the embodiment. For example, detection system 750 may be deployed as a detection appliance at a client site to detect any suspicious content, for example, at a local area network (LAN) of the client. In addition, any of MCDS 792 and MCDS 794 may also be deployed as dedicated data analysis systems. Systems 750 and 792-794 may be configured and managed by a management system 796 over network 790, which may be a LAN, a wide area network (WAN) such as the Internet, or a combination of both. Management system 796 may be implemented as a Web server having a Web interface to allow an administrator of a client (e.g., corporation entity) to log in to manage detection systems 750 and 792-794. For example, an administrator may able to activate or deactivate certain functionalities of malicious content detection systems 750 and 792-794 or alternatively, to distribute software updates such as malicious content definition files (e.g., malicious signatures or patterns) or rules, etc. Furthermore, a user can submit via a Web interface suspicious content to be analyzed, for example, by dedicated data analysis systems 792-794. As described above, malicious content detection includes static detection and dynamic detection. Such static and dynamic detections can be distributed amongst different systems over a network. For example, static detection may be performed by detection system 750 at a client site, while dynamic detection of the same content can be offloaded to the cloud, for example, by any of detection systems 792-794. Other configurations may exist.

IX. Conclusion

The embodiments discussed herein are illustrative. As these embodiments are described with reference to illustrations, various modifications or adaptations of the methods and/or specific structures described may become apparent to those skilled in the art. For example, aspects of the embodiments may be performed by executable software, such as a program or operating system. For example, embodiments of the local analyzer may be implemented in an operating system. Of course, the operating system may incorporate other aspects instead of or in addition to that just described, as will be appreciated in light of the description contained in this specification. Similarly, a utility or other computer program executed on a server or other computer system may also implement the local analyzer or other aspects. Noteworthy, these embodiments need not employ a virtual environment, but rather test for callback activity during normal execution of the operating system, utility or program within a computer system.

It should be understood that the operations performed by the above-described illustrative embodiments are purely exemplary and imply no particular order unless explicitly required. Further, the operations may be used in any sequence when appropriate and may be partially used. Embodiments may employ various computer-implemented operations involving data stored in computer systems. These operations include physical manipulation of physical quantities. Usually, though not necessarily, these quantities take the form of electrical, magnetic, or optical signals capable of being stored, transferred, combined, compared, and otherwise manipulated.

Any of the operations described herein are useful machine operations. The present invention also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations, or multiple apparatus each performing a portion of the operations. Where apparatus or components of apparatus are described herein as being coupled or connected to other apparatus or other components, the connection may be direct or indirect, unless the context requires otherwise.

The present invention may be embodied as computer readable code on a computer readable medium. The computer readable medium is any data storage device that can store data, which can be thereafter read by a computer system. Examples of the computer readable medium include hard drives, flash drives, read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The terms "logic", "module", "engine" and "unit" are representative of hardware, firmware or software that is configured to perform one or more functions. As hardware, these components may include circuitry such as processing circuitry (e.g., a microprocessor, one or more processor cores, a programmable gate array, a microcontroller, an application specific integrated circuit, etc.), receiver, transmitter and/or transceiver circuitry, semiconductor memory, combinatorial logic, or other types of electronic components. When implemented in software, the logic, modules, engines, and units may be in the form of one or more software modules, such as executable code in the form of an executable application, an operating system, an application programming interface (API), a subroutine, a function, a procedure, an applet, a servlet, a routine, source code, object code, a script, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage. Software is operational when executed by processing circuitry. Execution may be in the form of direct execution, emulation, or interpretation.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

It will be appreciated by those of ordinary skill in the art that modifications to and variations of the above-described embodiments of a system and method of detecting callbacks and associated malware may be made without departing from the inventive concepts disclosed herein. Accordingly, the specification and drawings are to be regarded as illustrative rather than restrictive, and the invention should not be viewed as limited except as by the scope and spirit of the appended claims. It will be recognized that the terms "comprising," "including," and "having," as used herein, are specifically intended to be read as open-ended terms of art.

What is claimed is:

1. A system for detecting malicious callbacks from malicious code, comprising:
    a first local analyzer to capture packets that are part of communications over a network, generate a signature from information obtained from at least one captured packet of the captured packets, determine whether the signature matches any signature of a first plurality of signatures stored in a first storage device that is accessible to the first local analyzer, and determine whether the at least one captured packet includes an anomaly in response to the signature failing to match any of the signatures of the first plurality of signatures; and
    a central analyzer, including a processor and a memory, remotely located and communicatively coupled to the first local analyzer, the central analyzer to receive a portion of the information and the signature from the first local analyzer in response to the signature failing to match any of the signatures stored in the first storage device, the central analyzer including logic that, upon execution by the processor, is configured to determine whether the signature matches a verified callback signature being a signature associated with malware callback stored within a second storage device that is accessible to the central analyzer, the second storage device including a second plurality of signatures that is greater in number than the first plurality of signatures, wherein
    in response to the signature failing to match any verified callback signature stored within the second data storage device, the central analysis to (i) perform an analysis on the portion of the information obtained from the at least one captured packet that is provided to the central analyzer; (ii) determine whether the at least one captured packet is associated with a malicious callback; and (iii) store a designation identifying that the at least one captured packet is associated with the malicious callback with the signature associated with the at least one captured packet in the second storage device.

2. The system of claim 1, wherein the central analyzer being further configured to provide the signature to a second local analyzer communicatively coupled to the central analyzer and different than the first local analyzer in response to the signature matching the verified callback signature.

3. The system of claim 1, wherein the central analyzer being implemented as part of a cloud-based server and in communication with at least the first local analyzer and the second local analyzer that are located in different enterprise networks.

4. The system of claim 1, wherein the local analyzer comprises
    local signature matching logic that generates the signature from information obtained from the at least one captured packet and determines whether the signature matches any signature of the first plurality of signatures stored within the first storage device implemented within the local analyzer; and
    inspection logic that analyzes one or more packet headers of the at least one captured packet for anomalies that identify the at least one captured packet potentially include malware.

5. The system of claim 4, wherein the central analyzer to receive the portion of the information and the signature from the first local analyzer in response to (i) the local signature matching logic failing to match any of the signatures stored in the first storage device and (ii) the inspection logic analyzing the one or more packet headers and identifying an anomaly associated with the one or more packet headers.

6. The system of claim 5, wherein the local signature matching logic generates the signature by removing parameter values within the one or more packet headers to remove personal information associated with a sender of the at least one captured packet and generating a hash value from remaining information within the one or more packet headers.

7. The system of claim 4, wherein the inspection logic analyzes the one or more packet headers by at least identifying (i) non-standard patterns as content within fields of the at least one captured packet relative to an Hypertext Transfer Protocol (HTTP) protocol or (ii) invalid header sequencing for the HTTP protocol.

8. The system of claim 1, wherein the first storage device operates as a local signature cache implemented within the local analyzer and accessed by a hardware processor implemented within the local analyzer and the second storage device operates as a global signature cache implemented within the central analyzer and accessed by a hardware processor implemented within the central analyzer.

9. The system of claim 4, wherein the inspection logic analyzes the one or more packet headers by at least (a) identifying invalid header sequencing for an Hypertext Transfer Protocol (HTTP) protocol or (b) comparing structures of the one or more packet headers with at least (i) a whitelist of prevalent, legitimate header structures for the HTTP protocol or (ii) a blacklist of illegitimate header structures for the HTTP protocol.

10. The system of claim 1, wherein the at least one captured packet is determined to be associated with the malicious callback by at least (i) generating a callback probability score associated with the at least one captured packet and (ii) determining the at least one captured packet has the callback probability score exceeding a predetermined threshold as being associated with the malicious callback.

11. The system of claim 1, wherein the central analyzer comprises
 global signature matching logic that determines whether the signature matches a verified callback signature of the second plurality of signatures; and
 in response to, at least in part, the global signature matching logic failing to determine that the signature matching any of the second plurality of signatures, threat heuristics logic performs an analysis of one or more packet headers of the at least one captured packet to determine whether a packet header of the one or more packet headers includes a bootkit.

12. The system of claim 11, wherein the central analyzer further comprises
 evaluation logic that accesses a uniform resource locator (URL) within the one or more packet headers, determines a reputation of a destination of the URL based on on-line resources including information obtained by visiting a website accessible using the URL, and provides a portion of the information acquired when determining the reputation of the destination of the URL in response to the evaluation logic determining that (i) the URL is suspicious attribute that requires additional analysis and (ii) the signature failed to match any of the second plurality of signatures.

13. The system of claim 1, wherein the local analyzer comprises
 local signature matching logic that generates the signature from information obtained from the at least one captured packet and determines whether the signature matches any signature of the first plurality of signatures; and
 inspection logic that analyzes a domain identifier contained within a field of a packet header of the one packet headers, where the domain identifier is deemed to be suspicious and require additional analysis to determine whether the packet header is associated with a callback.

14. A local analyzer comprising:
 a network interface to receive a plurality of packets captured from network traffic;
 one or more processors communicatively coupled to the network interface; and
 a storage device communicatively coupled to the one or more processors, the storage device comprises
  a signature generating logic that, when executed by the one or more processors, generates a header signature based on information from a header obtained from a captured packet of the plurality of captured packets,
  a signature matching logic that, when executed by the one or more processors, determines whether the header signature corresponds to one of a plurality of packet header signatures corresponding to verified callbacks,
  an inspection logic that, when executed by the one or more processors and in response to the header signature failing to match any of the plurality of packet header signatures, detects whether the captured packet header includes one or more header anomalies, the captured packet header identified as having one or more header anomalies being a suspect header, and
  a local storage device that includes the plurality of packet header signatures corresponding to verified callbacks, the plurality of packet header signatures are updated with additional packet header signatures corresponding to verified callbacks, and
  a reporting logic that, when executed by the one or more processors and in response to the inspection logic detecting that the captured packet header includes one or more header anomalies, transmits the header signature and information associated with the captured packet to a central analyzer for further analysis to determine whether the captured packet is part of a malicious callback.

15. The local analyzer of claim 14, wherein the signature matching logic, when executed by the one or more processors, is configured for use the header signature as an index in searching the local storage device for one of the plurality of packet header signatures corresponding to verified callbacks.

16. The local analyzer of claim 14, wherein the signature matching logic generates the header signature by removing parameter values within the header of the captured packet to remove personal information associated with a sender of the captured packet and generating a hash value from remaining information within the header.

17. The local analyzer of claim 14, wherein the inspection logic is configured to detect whether the captured packet header includes one or more header anomalies by at least identifying non-standard patterns as content within fields of the captured packet relative to a Hypertext Transfer Protocol (HTTP) protocol.

18. The local analyzer of claim 14, wherein the inspection logic is configured to detect whether the captured packet header includes one or more header anomalies by at least identifying invalid header sequencing for a selected applicable protocol.

19. The local analyzer of claim 14, wherein the inspection logic is configured to detect whether the captured packet header includes one or more header anomalies by at least comparing structures of the captured packet header with at least (i) a whitelist of prevalent, legitimate header structures for a selected application protocol or (ii) a blacklist of illegitimate header structures for the selected applicable protocol.

20. The local analyzer of claim 14 further comprising an alert generator that, when executed by the one or more processors, is configured, in the event of a signature match, to generate an alert being a warning to a user or a security administrator that the captured packet may be associated with malware.

21. A central analyzer in communications with a plurality of local analyzers over a network, the central analyzer comprising:
  a network interface operable to receive information associated with a packet under analysis from a local analyzer of the plurality of local analyzers for further analysis to determine whether the packet under analysis is part of a malicious callback;
  one or more hardware processors; and
  a storage device coupled to the one or more hardware processors, the storage device comprises
    a signature matching logic that, when executed by the one or more hardware processors, determines whether a header signature for a suspect header of the packet under analysis corresponds to one of a plurality of header signatures associated with verified callbacks that are stored in a storage device accessible by the central analyzer,
    evaluation logic that, when executed by the one or more hardware processors, accesses content within the suspect header to determine a likelihood of the content being associated with malicious activity, and
    threat heuristics logic that, when executed by the one or more hardware processors, generates a pattern that contains attributes associated with the packet under analysis, analyzes the pattern, and determines a probability of one or more attributes associated with the pattern includes malware and is associated with a malicious callback,
  wherein the network interface further operable to return a message to the local analyzer containing information with respect to the suspect header being verified as corresponding to a malicious callback.

* * * * *